(12) United States Patent
Grier et al.

(10) Patent No.: US 7,973,275 B2
(45) Date of Patent: Jul. 5, 2011

(54) MANIPULATION OF OBJECTS IN POTENTIAL ENERGY LANDSCAPES

(75) Inventors: David G. Grier, New York, NY (US);
Marco Polin, New York, NY (US);
Sang-Hyuk Lee, Rego Park, NY (US);
Yael Roichman, New York, NY (US);
Kosta Ladavac, Ridgefield, CT (US)

(73) Assignee: New York University, New York, NY (US)

(*) Notice: Subject to any disclaimer, the term of this patent is extended or adjusted under 35 U.S.C. 154(b) by 275 days.

(21) Appl. No.: 12/343,193

(22) Filed: Dec. 23, 2008

(65) Prior Publication Data
US 2009/0101807 A1 Apr. 23, 2009

Related U.S. Application Data

(62) Division of application No. 11/285,224, filed on Nov. 22, 2005, now Pat. No. 7,473,890.

(60) Provisional application No. 60/630,378, filed on Nov. 23, 2004, provisional application No. 60/656,482, filed on Feb. 24, 2005, provisional application No. 60/663,218, filed on Mar. 18, 2005.

(51) Int. Cl.
*H05H 3/00* (2006.01)

(52) U.S. Cl. ............ 250/251; 250/222.2; 359/296
(58) Field of Classification Search ............... 250/251
See application file for complete search history.

(56) References Cited

U.S. PATENT DOCUMENTS

| | | | |
|---|---|---|---|
| 4,649,026 A | 3/1987 | Postle et al. | |
| 6,055,106 A * | 4/2000 | Grier et al. | 359/566 |
| 6,072,581 A * | 6/2000 | Stephenson et al. | 356/521 |
| 6,475,639 B2 | 11/2002 | Shahinpoor et al. | |
| 6,605,453 B2 | 8/2003 | Ozkan et al. | |
| 6,624,940 B1 | 9/2003 | Grier et al. | |
| 6,639,208 B2 | 10/2003 | Grier et al. | |
| 6,797,942 B2 | 9/2004 | Grier et al. | |
| 6,815,664 B2 | 11/2004 | Wang et al. | |
| 6,847,032 B2 | 1/2005 | Grier et al. | |
| 2003/0007894 A1 | 1/2003 | Wang et al. | |
| 2005/0094232 A1 | 5/2005 | Kibar | |
| 2005/0164372 A1 | 7/2005 | Kibar | |

* cited by examiner

*Primary Examiner* — Phillip A Johnston
(74) *Attorney, Agent, or Firm* — Foley & Lardner LLP

(57) ABSTRACT

Holographic optical traps using the forces exerted by computer-generated holograms to trap, move and otherwise transform mesoscopically textured materials. The efficacy of the present invention is based upon the quality and nature of the diffractive optical element used to create the traps and dynamically use them. Further a landscape of potential energy sites can be created and used to manipulate, sort and process objects.

17 Claims, 16 Drawing Sheets

-10 μm   0 μm   +10 μm

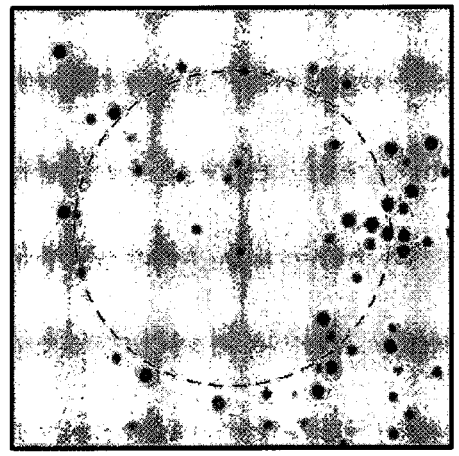
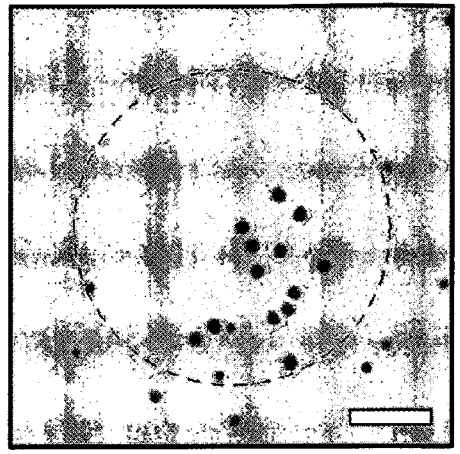
FIG. 10C  FIG. 10D
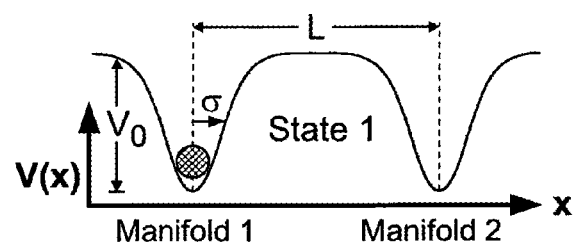
FIG. 11A
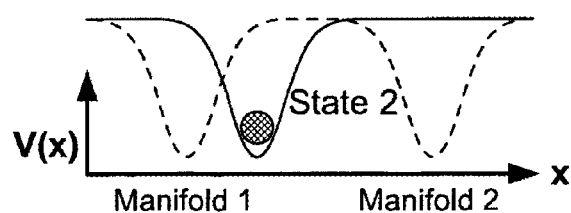
FIG. 11B

MANIPULATION OF OBJECTS IN POTENTIAL ENERGY LANDSCAPES

CROSS-REFERENCE TO RELATED PATENT APPLICATIONS

This application is a divisional application and claims priority to U.S. patent application Ser. No. 11/285,224 filed on Nov. 22, 2005, which claims priority to U.S. Provisional Patent Application No. 60/630,378 filed on Nov. 23, 2004; U.S. Provisional Patent Application No. 60/656,482 filed on Feb. 24, 2005; and U.S. Provisional Patent Application No. 60/663,218 filed on Mar. 18, 2005 and these applications are incorporated herein by reference in their entirety.

This work was supported by the National Science Foundation through Grant Number DBI-0233971, with additional support from Grant Number DMR-0451589.

FIELD OF THE INVENTION

The present invention relates generally to the creation and use of holographic optical traps. More particularly, the present invention relates to the optimization of three-dimensional configurations of holographic optical traps, to the creation of multiple state thermal ratchets for media locomotion and manipulation, and to the creation and use of potential energy well/peak landscapes for fractionation and sorting functionalities.

BACKGROUND OF THE INVENTION

A single laser beam brought to a focus with a strongly converging lens forms a type of optical trap widely known as an optical tweezer. Multiple beams of light passing simultaneously through the lens' input pupil yield multiple optical tweezers, each at a location determined by its beam's angle of incidence and degree of collimation at the input pupil. The trap-forming laser beams form an interference pattern as they pass through the input pupil, whose amplitude and phase corrugations characterize the downstream trapping pattern. Imposing the same modulations on a single incident beam at the input pupil would yield the same pattern of traps, but without the need to create and direct a number of independent input beams. Such wavefront modification can be performed by a type of diffractive optical element (DOE) commonly known as a hologram.

Holographic optical trapping (HOT) uses methods of computer-generated holography (CGH) to project arbitrary configurations of optical traps, with manifold applications in the physical and biological sciences, as well as in industry. This flexible approach to manipulate and transform mesoscopic matter has been used to assemble two- and three-dimensional structures, to sort objects ranging in size from nanoclusters to living cells, and to create all-optical microfluidic pumps and mixers.

SUMMARY OF THE INVENTION

The present invention involves refinements of the basic HOT technique that help to optimize the traps' performance, as well as a suite of statistically optimal analytical tools that are useful for rapidly characterizing the traps' performance. A number of modifications to the conventional HOT optical train minimize defects due to limitations of practical implementations. A direct search algorithm for HOT DOE computation can be used that is both faster and more accurate than commonly used iterative refinement algorithms. A method for rapidly characterizing each trap in a holographic array is also described. The optimal statistical methods on which this characterization technique is based lends itself naturally to digital video analysis of optically trapped spheres and can be exploited for real-time optimization.

In accordance with another aspect of the present invention the holographic traps are used to implement thermal ratchets in one, two, and three dimensions. A radial three-state ratchet is illustrated where particles of different size accumulate at different radial positions. A radial two-state ratchet may be achieved as a two-dimensional extension of the methods described above as well.

In accordance with yet another aspect of the present invention, the ratchet is spherical. This is an extension of the two-dimensional radial ratchet to three dimensions where spherical arrays of optical traps or other forms of potential energy wells sort and accumulate particles or objects of different sizes at different spherical positions. This may take the form of a two-state or three-state ratchet.

The two-state and three-state ratchets provide for a number of methods and apparatus for locomotion. These methods of locomotion are achieved broadly through the use of multiple potential energy wells. The potential energy wells may be achieved through a variety of methods. In the description above the method used is arrays of holographic optical traps. Additional methods include use of other photonic methods to implement two-state and three-state ratchets based on the various available methods of light steering. These also include chemical, biological, electrical, or other various mechanical methods involving two-state or three-state ratchets in which an aspect of the present invention may include a movable lever or arm. This movable lever or arm may be user controllable so as to enable a number of devices or mechanisms which sort or pump or provide various forms of locomotion for particles or objects.

In accordance with yet another aspect of the present invention is a polymer walker. This may be created through a walker shaped more or less like a capital Greek letter lambda out of a polymeric material such as a gel that responds to an external stimulus by changing the opening angle between its legs. Examples of such active materials include Tanaka gels, which can be functionalized to respond to changes in salt concentration, electrolyte valence, pH, glucose concentration, temperature, and even light. These gels respond to such stimuli by swelling or shrinking. This can be used to achieve the kind of motion described above for a two-state ratchet. The rates of opening and closing can be set by chemical kinetics in such a system. The legs' affinity for specific places on a substrate can be determined by chemical, biochemical, or physical patterning of a suitable substrate, with the ends of the legs appropriately functionalized to respond to those patterns.

In accordance with yet another aspect of the present invention two state and three-state ratchets are used to build micromachines which may consist of mesoscopic motors based on synthetic macromolecules or microelectromechanical systems (MEMS).

These ratchet mechanisms may be used in the fabrication of devices or apparatus which pump, sort, shuttle or otherwise transport or manipulate particles or cargo in a variety of patterns with application to a range of fields including but not limited to sorting systems, transport systems, shuttle systems, sensor systems, reconnaissance systems, delivery systems, fabrication systems, purification systems, filtration systems, chemical processing, medical diagnostics and medical therapeutics.

In accordance with yet another aspect of the present invention, potential energy wells may be created using any of various methods of creating potential energy landscapes including without limitation electrophoresis, dielectrophoresis, traveling wave dielectrophoresis, programmable dielectrophoresis, CMOS dielectrophoresis, optically induced eletrophoretic methods, acoustic traps, and hydrodynamic flows as well as other various such methods. These methods may be programmable. These methods may further be programmed or constructed and controlled so as to create potential energy landscapes and potential energy wells that implement the various ratchet and fractionation constructs as presented above.

In accordance with yet another aspect of the present invention, potential energy landscapes may be created from a class of sources including optical intensity fields, optically guided dielectrophoresis, and any other technique including surface relief on a textured surface. Furthermore the present invention may be implemented as an optically guided dielectrophoresis implementation of optical fractionation, (which may be referred to as optically guided dielectrophoretic fractionation) as well as an optically guided dielectrophoretic implementation of optical ratchets (which may be referred to as optically guided dielectrophoretic ratchets).

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 10(c) is small particles being collected and large ones excluded at L=6.9 $\mu m$ and t=4.5 sec.; and FIG. 10(d) shows large particles concentrated at L=5.3 $\mu m$ and t=4.5 sec. (the scale bar is 10 $\mu m$).

FIG. 11(a)-11(d) shows a four-part sequence of spatially symmetric three-state ratchet potentials;

DETAILED DESCRIPTION OF THE PREFERRED EMBODIMENTS

A. Optimized Holographic Optical Traps

Figures 1A, 1B, 1C:
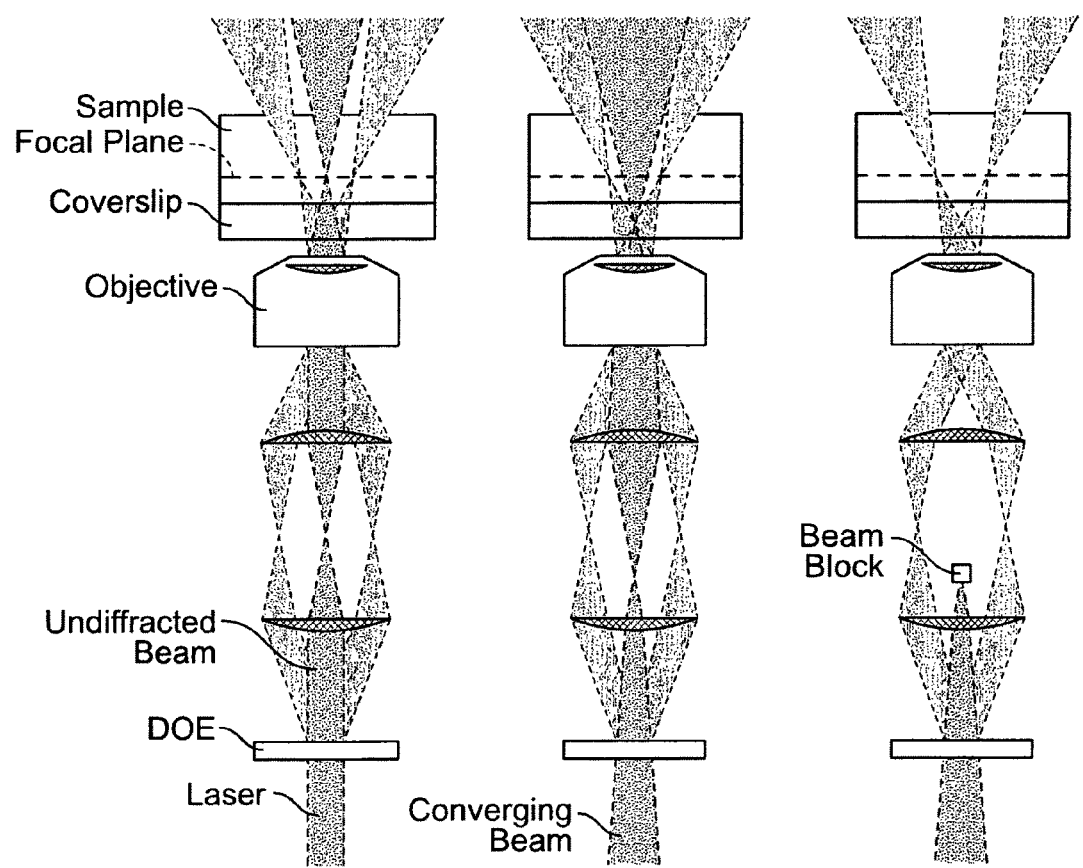
FIG. 1(a) is a simplified schematic of a conventional HOT implementation.
FIG. 1(b) shows a modification to the conventional HOT design of FIG. 1(a) that minimizes the central spot's influence and effectively eliminates ghost traps by having the source laser beam converge as it passes through the DOE.
FIG. 1(c) shows another modification to the conventional HOT design where a beam block is placed in the intermediate focal plane within the relay optics to spatially filter the undiffracted portion of the beam.

FIGS. 1(a)-1(c) show a simplified schematic of a holographic optical tweezer optical train before and after modification. FIG. 1(a) shows a simplified schematic of a conventional HOT implementation, where a collimated beam of light from a source laser is imprinted with a CGH and thereafter propagates as a superposition of independent beams, each with individually specified wavefront characteristics. These beams are relayed to the input aperture of a high-numerical-aperture lens, typically a microscope objective, which focuses them into optical traps in the objective's focal plane. FIG. 1(a) shows the CGH being projected by a transmissive DOE. The same principle applies to reflective DOE's with the appropriate modification of the optical train. It should be noted that the same objective lens used to form the optical traps also can be used to create images of trapped objects. The associated illumination and image-forming optics are omitted from FIGS. 1(a)-1(c) for clarity.

Practical holograms only diffract a portion of the incident light into intended modes and directions. A portion of the incident beam is not diffracted at all, and the undiffracted portion typically forms an unwanted trap in the middle of the field of view. The undiffracted portion of the beam is depicted with dark shading in FIG. 1(a). This "central spot" has been removed in previous implementations by spatially filtering the diffracted beam. Practical DOE's also tend to project spurious "ghost" traps into symmetry-dictated positions within the sample. Spatially filtering a large number of ghost traps generally is not practical, particularly in the case of dynamic holographic optical tweezers whose traps move freely in three dimensions. Projecting holographic traps in the off-axis Fresnel geometry, rather than the Fraunhofer geometry, automatically eliminates the central spot. However, this implementation limits the number of traps that can be projected and also does not address the formation of ghost traps.

FIG. 1(b) shows one improvement to the basic HOT design that minimizes the central spot's influence and effectively eliminates ghost traps. In FIG. 1(b), the source laser beam is converging as it passes through the DOE. As a result, the undiffracted central spot focuses upstream of the objective's normal focal plane. The degree of collimation of each diffracted beam, and thus the axial position of the resulting trap, can be adjusted by incorporating wavefront-shaping phase functions into the hologram's design, thereby returning the traps to the focal volume. This expedient allows the central spot to be projected into the coverslip bounding a sample, rather than the sample itself, thereby ensuring that the undiffracted beam lacks both the intensity and the gradients needed to influence a sample's dynamics.

An additional consequence of the traps' displacement relative to the converging beam's focal point is that ghost traps are projected to the far side of this point and, therefore, out of the sample volume altogether. This constitutes a substantial improvement for processes, such as optical fractionation, which use a precisely specified optical potential energy landscape to continuously sort mesoscopic objects.

Even though the undiffracted beam may not create an actual trap in this modified optical train, it still can exert radiation pressure on the region of the sample near the center of the field of view. This is a particular issue for large arrays of optical traps that require substantial power in the source beam. The undiffracted portion then can produce a central spot far brighter than any individual trap.

Illuminating the DOE with a diverging beam further reduces the undiffracted beam's influence by projecting some of its light out of the optical train. In a thick sample, however, this has the deleterious effect of projecting both the weakened central spot and the undiminished ghost traps into the sample.

These issues can be mitigated by placing a beam block as shown in FIG. 1(c) in the intermediate focal plane within the relay optics to spatially filter the undiffracted portion of the beam. Because the trap-forming beams come to a focus in a different plane, they are only slightly occluded by the beam block, even if they pass directly along the optical axis. The effect of this occlusion is minimal for conventional optical tweezers and can be compensated by appropriately increasing their relative brightness. Therefore, the effect of an arrangement as described in FIG. 1(c) is the elimination of the undiffracted beam without substantially degrading the optical traps.

Holographic optical tweezers' efficacy is determined by the quality of the trap-forming DOE, which in turn reflects the performance of the algorithms used in their computation. Conventional implementations have applied holograms calculated by a simple linear superposition of the input fields. In such situations, the best results are obtained with random relative phases or with variations on the classic Gerchberg-Saxton and Adaptive-Additive algorithms. Despite their general efficacy, these algorithms yield traps whose relative intensities can differ substantially from their design values and typically project a substantial fraction of the input power into ghost traps. These problems can become acute for complicated three-dimensional trapping patterns, particularly when the same hologram also is used as a mode converter to project multifunctional arrays of optical traps.

A faster and more effective algorithm for HOT DOE calculation based on direct search is generally as follows. The holograms used for holographic optical trapping typically operate only on the phase of the incident beam, and not its amplitude. Such phase-only holograms, also known as kinoforms, are far more efficient than amplitude-modulating holograms, which necessarily divert light away from the beam. Kinoforms also are substantially easier to implement than fully complex holograms. General trapping patterns can be achieved with kinoforms despite the loss of information that might be encoded in amplitude modulations because optical tweezers rely for their operation on intensity gradients and not local phase variations. However, it is necessary to find a pattern of phase shifts in the input plane that encodes the desired intensity pattern in the focal volume.

According to scalar diffraction theory, the (complex) field $E(\vec{r})$ in the focal plane of a lens of focal length f is related to the field, $u(\vec{\rho})\exp(i\phi(\vec{\rho}))$, in its input plane by a Fraunhofer transform, $$E(\vec{r}) = \int u(\vec{\rho})\exp(i\varphi(\vec{\rho}))\exp\left(-i\frac{k\vec{r}\cdot\vec{\rho}}{2f}\right)d^2\rho, \quad (1)$$

where $u(\vec{\rho})$ and $\phi(\vec{\rho})$ are the real-valued amplitude and phase, respectively, of the field at position $(\vec{\rho})$ in the input pupil, and $k=2\pi/\lambda$ is the wave number of light of wavelength $\lambda$.

If $u(\vec{\rho})$ is the amplitude profile of the input laser beam, then $\phi(\vec{\rho})$ is the kinoform encoding the pattern. Most practical DOEs, including those projected with SLMs, consist of an array $\vec{\rho}_j$ of discrete phase pixels, each of which can impose any of P possible discrete phase shifts $\phi_j \in \{0, \ldots, \phi_{P-1}\}$. The field in the focal plane due to such an N-pixel DOE is, therefore, $$E(\vec{r}) = \sum_{j=1}^{N} u_j \exp(i\varphi_j) T_j(\vec{r}), \tag{2}$$

where the transfer matrix describing the propagation of light from input plane to output plane is $$T_j(\vec{r}) = \exp\left(-i\frac{k\vec{r}\cdot\vec{\rho}_j}{2f}\right). \tag{3}$$

Unlike more general holograms, the desired field in the output plane of a holographic optical trapping system consists of M discrete bright spots located at $\vec{r}_m$:

$$E(\vec{r}) = \sum_{m=1}^{M} E_m(\vec{r}), \text{ with} \tag{4}$$

$$E_m(\vec{r}) = \alpha_m \delta(\vec{r} - \vec{r}_m) \exp(i\xi_m), \tag{5}$$

where $\alpha_m$ is the relative amplitude of the m-th trap, normalized by $$\sum_{m=1}^{M} |a_m|^2 = 1,$$

and $\xi_m$ is its (arbitrary) phase. Here, $\delta(\vec{r})$ represents the amplitude profile of the focused beam of light in the focal plane, which may be treated heuristically as a two-dimensional Dirac delta function. The design challenge is to solve Eqs. (2), (3) and (4) for the set of phase shifts $\xi_m$, yielding the desired amplitudes $\alpha_m$ at the correct locations $\vec{r}_m$ given $u_j$ and $T_j(\vec{\rho})$.

The Gerchberg-Saxton algorithm and its generalizations, such as the adaptive-additive algorithm, iteratively solve both the forward transform described by Eqs. (5) and (6), and also its inverse, taking care at each step to converge the calculated amplitudes at the output plane to the design amplitudes and to replace the back-projected amplitudes, $u_j$ at the input plane with the laser's actual amplitude profile. Appropriately updating the calculated input and output amplitudes at each cycle can cause the DOE phase $\phi_j$, to converge to an approximation to the ideal kinoform, with monotonic convergence possible for some variants. The forward and inverse transforms mapping the input and output planes to each other typically are performed by fast Fourier transform (FFT). Consequently, the output positions $\vec{r}_m$ also are explicitly quantized in units of the Nyquist spatial frequency. The output field is calculated not only at the intended positions of the traps, but also at the spaces between them. This is useful because the iterative algorithm not only maximizes the fraction of the input light diffracted into the desired locations, but also minimizes the intensity of stray light elsewhere.

FFT-based iterative algorithms have drawbacks for computing three-dimensional arrays of optical tweezers, or mixtures of more general types of traps. To see this, one notes how a beam-splitting DOE can be generalized to include wave front-shaping capabilities.

A diverging or converging beam at the input aperture comes to a focus and forms a trap downstream or upstream of the focal plane, respectively. Its wave front at the input plane is characterized by the parabolic phase profile $$\varphi_z(\vec{\rho}, z) = \frac{k\rho^2 z}{f^2}, \tag{6}$$

where z is the focal spot's displacement along the optical axis relative to the lens' focal plane. This phase profile can be used to move an optical trap relative to the focal plane even if the input beam is collimated by appropriately augmenting the transfer matrix:

$$T_j^z(\vec{r}) = T_j(\vec{r}) K_j^z(\vec{r}), \tag{7}$$

where the displacement kernel is $$K_j^z(\vec{r}) = \exp(i\phi_z(\vec{\rho}_j, z)), \tag{8}$$

The result, $T_j^z(\vec{r})$, replaces $T_j(\vec{r})$ as the kernel of Eq. (2).

Similarly, a conventional TEM beam can be converted into a helical mode by imposing the phase profile $$\phi_l(\vec{\rho}) = l\theta, \tag{9}$$

where $\theta$ is the azimuthal angle around the optical axis and l is an integral winding number known as the topological charge. Such corkscrew-like beams focus to ring-like optical traps known as optical vortices that can exert torques as well as forces. The topology-transforming kernel $K_j^l(\vec{r}) = \exp(i\phi_l(\vec{\rho}_j))$ can be composed with the transfer matrix in the same manner as the displacement-inducing $\vec{r}_m$.

A variety of comparable phase-based mode transformations are described, each with applications to single-beam optical trapping. All can be implemented by augmenting the transfer matrix with an appropriate transformation kernel. Moreover, different transformation operations can be applied to each beam in a holographic trapping pattern independently, resulting in general three-dimensional configurations of diverse types of optical traps.

Calculating the phase pattern $\phi_j$ encoding multifunctional three-dimensional optical trapping patterns requires only a slight elaboration of the algorithms used to solve Eq. (2) for two-dimensional arrays of conventional optical tweezers. The primary requirement is to measure the actual intensity projected by $\phi_j$ into the m-th trap at its focus. If the associated diffraction-generated beam has a non-trivial wave front, then it need not create a bright spot at its focal point. On the other hand, if it is assumed that $\phi_j$ creates the required type of beam for the m-th trap through a phase modulation described by the transformation kernel $K_{j,m}(\vec{r})$, then applying the inverse operator, $K_{j,m}^{-1}(\vec{r})$ in Eq. (2) would restore the focal spot.

This principle was first applied to creating three dimensional trap arrays in which separate translation kernels were used to project each desired optical tweezer back to the focal plane as an intermediate step in each iterative refinement cycle. Computing the light projected into each plane of traps in this manner involves a separate Fourier transform for the entire plane. In addition to its computational complexity, this approach also requires accounting for out-of-focus beams propagating through each focal plane, or else suffers from inaccuracies due to failure to account for this light.

A substantially more efficient approach involves computing the field only at each intended trap location, as $$E_m(\vec{r}_m) = \sum_{j=1}^{N} K_{j,m}^{-1}(\vec{r}_m) T_j(\vec{r}_m) \exp(-i\varphi_j), \quad (10)$$

and comparing the resulting amplitude $\alpha_m = |E_m|$ with the design value. Unlike the FFT-based approach, this per-trap algorithm does not directly optimize the field in the inter-trap region. Conversely, there is no need to account for interplane propagation. If the values of $\alpha_m$ match the design values, then no light is left over to create ghost traps.

Iteratively improving the input and output amplitudes by adjusting the DOE phases, $\phi_j$, involves back-transforming from each updated $E_m$ using the forward transformation kernels, $K_{j,m}(\vec{r}_m)$ with one projection for each of the M traps. By contrast, the FFT-based approach involves one FFT for each wave front type within each plane and may not converge if multiple wave front types are combined within a given plane.

The per-trap calculation suffers from a number of shortcomings. The only adjustable parameters in Eqs. (5) and (10) are the relative phases $\xi_m$ of the projected traps. These M−1 real-valued parameters must be adjusted to optimize the choice of discrete-valued phase shifts, $\phi_j$, subject to the constraint that the amplitude profile $u_j$ matches the input laser's. This problem is likely to be underspecified for both small numbers of traps and for highly complex heterogeneous trapping patterns. The result for such cases is likely to be optically inefficient holograms whose projected amplitudes differ from their ideal values.

Equation (10) suggests an alternative approach for computing DOE functions for discrete HOT patterns. The operator, $K_{j,m}^{-1}(\vec{r}_m) T_m(\vec{r}_m)$ describes how light in the mode of the m-th trap propagates from position $\vec{\rho}_j$ on the DOE to the trap's projected position $\vec{r}_m$, in the lens' focal plane. If the DOE's phase $\phi_j$ were changed at that point, then the superposition of rays composing the field at $\vec{r}_m$ would be affected. Each trap would be affected by this change through its own propagation equation. If the changes led to an overall improvement, then one would be inclined to keep the change, and seek other such improvements. If, instead, the results were less beneficial, $\phi_j$ would be restored to its former value and the search for other improvements would continue. This is the basis for direct search algorithms, including the extensive category of simulated annealing and genetic algorithms.

In its most basic form, direct search involves selecting a pixel at random from a trial phase pattern, changing its value to any of the P−1 alternatives, and computing the effect on the projected field. This operation can be performed efficiently by calculating only the changes at the M trap's positions due to the single changed phase pixel, rather than summing over all pixels. The updated trial amplitudes then are compared with their design values and the proposed change is accepted if the overall amplitude error is reduced. The process is repeated until the acceptance rate for proposed changes becomes sufficiently small.

The key to a successful and efficient direct search for $\phi_j$ is to select a function that effectively quantifies projection errors. The standard cost function, $$\sum_{m-1} M(I_m - \varepsilon I_m^{(D)})^2,$$

assesses the mean-squared deviations of the m-th trap's projected intensity $I_m = |\alpha_m|^2$ from its design value $I_m^{(D)}$, assuming an overall diffraction efficiency of $\varepsilon$. It requires an accurate estimate for $\varepsilon$ and places no emphasis on uniformity in the projected traps' intensities. A conventional alternative, $$C = -\langle I \rangle + f\sigma, \quad (11)$$

avoids both shortcomings. Here, $$\langle I \rangle = \frac{1}{M} \sum_{m=1}^{M} I_m$$

is the mean intensity at the traps, and $$\sigma = \sqrt{\frac{1}{M} \sum_{m=1}^{M} (I_m - \gamma I_m^{(D)})^2} \quad (12)$$

measures the deviation from uniform convergence to the design intensities. Selecting $$\gamma = \frac{\sum_{m=1}^{M} I_m I_m^{(D)}}{\sum_{m=1}^{M} (I_m^{(D)})^2} \quad (13)$$

minimizes the total error and accounts for non-ideal diffraction efficiency. The weighting fraction f sets the relative importance attached to overall diffraction efficiency versus uniformity.

In the simplest direct search for an optimal phase distribution, any candidate change that reduces C is accepted, and all others are rejected. Selecting pixels to change at random reduces the chances of the search becoming trapped by suboptimal configurations that happen to be highly correlated. The typical number of trials required for practical convergence should scale as N P, the product of the number of phase pixels and the number of possible phase values. In practice, this rough estimate is accurate if P and N are comparatively small. For larger values, however, convergence is attained far more rapidly, often within N trials, even for fairly complex trapping patterns. In this case, the full refinement requires computational resources comparable to the initial superposition and is faster than typical iterative algorithms by an order of magnitude or more.

Figure 2:
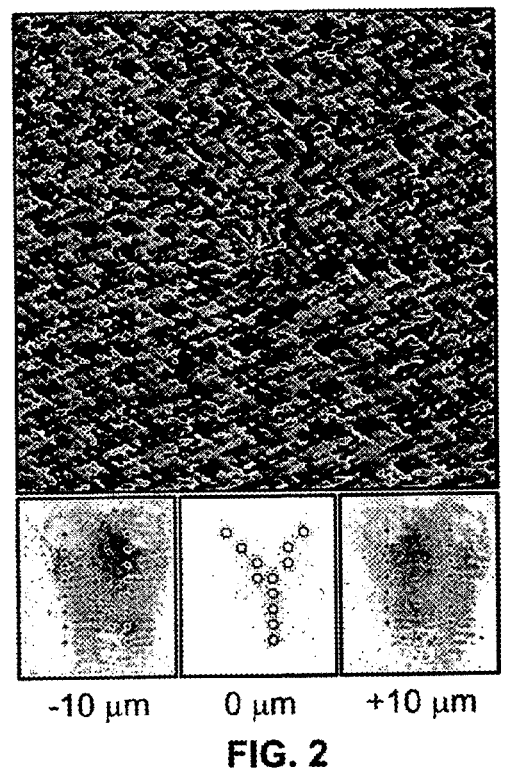
FIG. 2 shows a three-dimensional multifunctional holographic optical trap array created with a single phase-only DOE computed with the direct search algorithm, wherein the top DOE phase pattern includes white regions corresponding to a phase shift of $2\pi$ radians and black regions corresponding to 0, and wherein the bottom projected optical trap array is shown at $z=-10\,\mu m$, $0\,\mu m$ and $+10\,\mu m$ from the focal plane of a 100×, NA 1.4 objective lens, with the traps being spaced by 1.2 $\mu m$ in the plane, and the 12 traps in the middle plane consisting of $l=8$ optical vortices.

FIG. 2 shows a typical application of the direct search algorithm to computing a HOT DOE consisting of 51 traps, including 12 optical vortices of topological charge l=8, arrayed in three planes relative to the focal plane. The 480× 480 pixel phase pattern was refined from an initially random superposition of fields in which amplitude variations were simply ignored. The results in FIG. 2 were obtained with a single pass through the array. The resulting traps, shown in the bottom three images, vary from their planned relative intensities by less than 5 percent. This compares favorably with the 50 percent variation typically obtained with the generalized adaptive-additive algorithm. This effect was achieved by setting the optical vortices' brightness to 15 times that of the conventional optical tweezers. This single hologram therefore demonstrates independent control over three-dimensional position, wave front topology, and brightness of all the traps.

To demonstrate these phenomena more quantitatively, standard figures of merit are augmented with those known in the art. In particular, the DOE's theoretical diffraction efficiency is commonly defined as $$Q = \frac{1}{M} \sum_{m=1}^{M} \frac{I_m}{I_m^{(D)}}, \quad (14)$$

and its root-mean-square (RMS) error as $$e_{rms} = \frac{\sigma}{\max(I_m)}. \quad (15)$$

The resulting pattern's departure from uniformity is usefully gauged as $$u = \frac{\max(I_m / I_m^{(d)} - \min(I_m / I_m^{(D)}))}{\max(I_m / I_m^{(d)} + \min(I_m / I_m^{(D)}))}. \quad (16)$$

Figure 3:
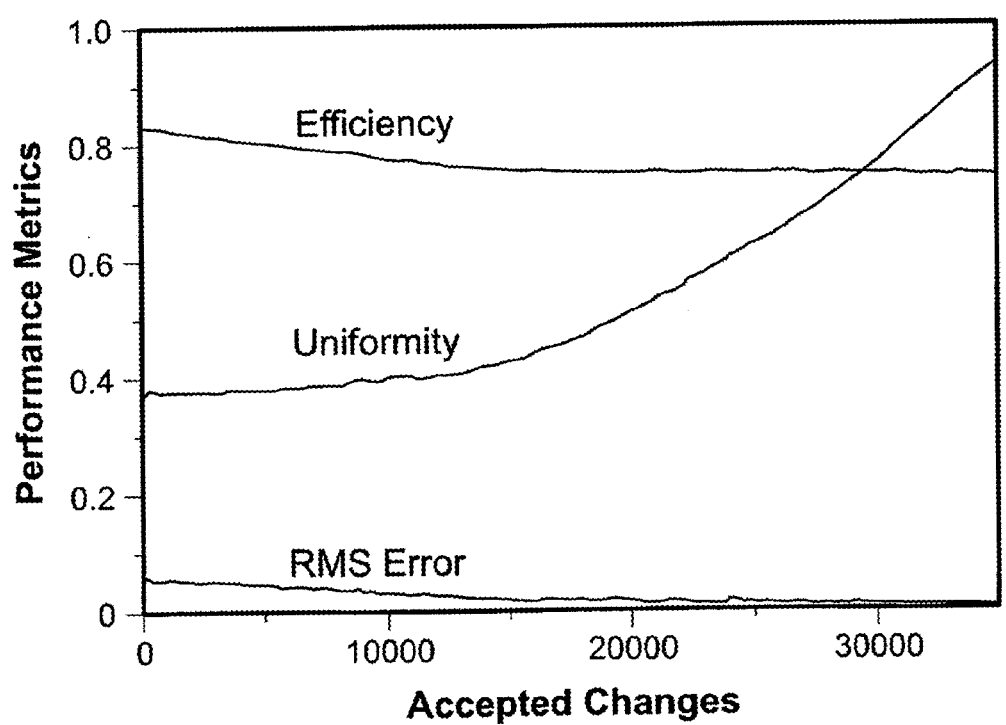
FIG. 3 is a plot showing the performance metrics for the hologram of FIG. 2 as a function of the number of accepted single-pixel changes, where data includes the DOE's overall diffraction efficiency as defined by Eq. (14), the projected patterns RMS error from Eq. (15), and its uniformity, $1-u$, where $u$ is defined in Eq. (16)

These performance metrics are plotted in FIG. 3 as a function of the number of accepted single-pixel changes. The overall acceptance rate for changes after a single pass through the entire DOE array was better than 16%.

FIG. 3 demonstrates that the direct search algorithm trades off a small percentage of the overall diffraction efficiency in favor of substantially improved uniformity. This improvement over randomly phased superposition requires little more than twice the computational time and typically can be completed in a time comparable to the refresh interval of a liquid crystal spatial light modulator.

Two-dimensional phase holograms contain precisely enough information to encode any two-dimensional intensity distribution. A three-dimensional or multi-mode pattern, however, may require both the amplitude and the phase to be specified in the lens' focal plane. In such cases, a two-dimensional phase hologram can provide at best an approximation to the desired distribution of traps. Determining whether or not a single two-dimensional phase hologram can encode a particular trapping pattern is remains an issue. The direct search algorithm presented above may become stuck in local minima of the cost function instead of identifying the best possible phase hologram. In such cases, more sophisticated numerical search algorithms may be necessary.

The most straightforward elaboration of a direct search is the class of simulated annealing algorithms. Like direct search, simulated annealing repeatedly attempts random changes to randomly selected pixels. Also like direct search, a candidate change is accepted if it would reduce the cost function. The probability $P_{accept}$ for accepting a costly change is set to fall of exponentially in the incremental cost $\Delta C$, $$P = \exp\left(-\frac{\Delta C}{C_0}\right). \quad (17)$$

where $C_o$ is a characteristic cost that plays the role of the temperature in the standard Metropolis algorithm. Increasing $C_o$ results in an increased acceptance rate of costly changes and a decreased chance of becoming trapped in a local minimum. The improved opportunities for finding the globally optimal solution come at the cost of increased convergence time.

The tradeoff between exhaustive and efficient searching can be optimized by selecting an appropriate value of $C_o$. However, the optimal choice may be different for each application. Starting $C_o$ at a large value that promotes exploration and then reducing it to a lower value that, speeds convergence offers one convenient compromise. Several strategies for varying $C_o$ have been proposed and are conventionally recognized.

Substantially more effective searches may be implemented by attempting to change multiple pixels simultaneously instead of one at a time. Different patterns of multi-pixel changes may be most effective for optimizing trap-forming phase holograms of different types, and the approaches used to identify and improve such patterns generally are known as genetic algorithms. These more sophisticated algorithms may be applicable for designing high-efficiency, high-accuracy DOEs for precision HOT applications.

At least numerically, direct search algorithms are both faster and better at calculating trap-forming DOEs than iterative refinement algorithms. The real test, however, is in the projected traps' ability to trap particles. A variety of approaches have been developed for gauging the forces exerted by optical traps. The earliest approach involved measuring the hydrodynamic drag required to dislodge a trapped particle, typically by translating the trap through quiescent fluid. This approach has several disadvantages, most notably that it identifies only the minimal escape force in a given direction and not the trap's actual three-dimensional potential energy landscape. Most conventionally-known implementations fail to collect sufficient statistics to account for thermal fluctuations' role in the escape process, and do not account adequately for hydrodynamic coupling to bounding surfaces.

Much more information can be obtained by measuring a particle's thermally driven motions in the trap's potential well. One approach involves measuring the particle's displacements $\vec{r}(t)$ from its equilibrium position and computing the probability density $P(\vec{r})$ as a histogram of these displacements. The result is related to the potential energy well $V(\vec{r})$ through the Boltzmann distribution $$P(\vec{r}) = \exp(-\beta V(\vec{r})), \quad (18)$$

where $\beta^{-1} = k_B T$ is the thermal energy scale at temperature T. Thermal calibration offers benefits in that no external force has to be applied, and yet the trap can be fully characterized, provided enough data is taken. A complementary approach to thermal calibration involves computing the autocorrelation function of $\Delta \vec{r}(t)$. Both of these approaches require amassing enough data to characterize the trapped particle's least probable displacements, and therefore most of its behavior is oversampled. This does not present a significant issue when data from a single optical trap can be collected at high sampling rates, for example with a quadrant photodiode. Tracking multiple particles in holographic optical traps, however, is most readily accomplished through digital video microscopy, which yields data more slowly by two or three orders of magnitude. Fortunately, an analysis based on optimal statistics provides all the benefits of thermal calibration by rigorously avoiding oversampling.

In many cases, an optical trap may be modeled as a harmonic potential energy well, $$V(\vec{r}) = \frac{3}{2}\sum_{i=1}^{3} \kappa_i r_i^2, \tag{19}$$

with a different characteristic curvature $K_i$ along each Cartesian axis. This form has been found to accurately describe optical traps' potential energy wells in related studies and has the additional benefit of permitting a one-dimensional mathematical description. Consequently, the subscripts are dropped in the following discussion.

The behavior of a colloidal particles localized in a viscous fluid by an optical trap is described by the Langevin equation $$\dot{x}(t) = -\frac{x(t)}{\tau} + \xi(t), \tag{20}$$

where the autocorrelation time $$\tau = \frac{\gamma}{\kappa} \tag{21}$$

is set by the viscous drag coefficient $\gamma$ and the curvature of the well, $\kappa$, and where $\xi(t)$ describes random thermal forcing with zero mean, $\langle \xi(t) \rangle = 0$, and variance $$\langle \xi(t)\xi(s) \rangle = \frac{2k_B T}{\gamma}\delta(t-s). \tag{22}$$

If the particle is at position $x_0^{x_0}$ at time t=0, its trajectory at later times is given by $$x(t) = x_0 \exp\left(-\frac{t}{\tau}\right) + \int_0^t \xi(s)\exp\left(-\frac{t-s}{\tau}\right)ds. \tag{23}$$

Experimentally, such a trajectory is sampled at discrete times $t_j = j\Delta t$, so that Eq. (23) may be rewritten as $$x_{j+1} = \tag{24}$$
$$\exp\left(-\frac{t_{j-1}}{\tau}\right)x_0 \int_0^{t_j} \xi(s)\exp\left(-\frac{t_j - s}{\tau}\right)ds + \int_{t_j}^{t_{j+1}} \xi(s)\exp\left(-\frac{t_{j+1} - s}{\tau}\right)ds$$

$$= \phi x_j + a_{j+1}, \tag{25}$$

where $$\phi = \exp\left(-\frac{\Delta t}{\tau}\right) \tag{26}$$

and where $\alpha_{j+1}$ is a Gaussian random variable with zero mean and variance $$\sigma_a^2 = \frac{k_B T}{\kappa}\left[1 - \exp\left(-\frac{2\Delta t}{\tau}\right)\right]. \tag{27}$$

Because $\phi<1$, Eq. (25) is an example of an autoregressive process which is readily invertible. In principle, the particle's trajectory $\{x_j\}$ can be analyzed to extract $\phi$ and $\sigma_a^2$, which, in turn, provide estimates for the trap's stiffness, $\kappa$, and the viscous drag coefficient $\gamma$.

In practice, however, the experimentally measured particle positions $y_j$ differ from the actual positions $x_j$ by random errors $b_j$, which is assumed to be taken from a Gaussian distribution with zero mean and variance $\sigma_b^2$. The measurement then is described by the coupled equations $$x_j = \phi x_{j-1} + a_j \text{ and}$$

$$y_j = x_j + b_j, \tag{28}$$

where $b_j$ is independent of $a_j$. Estimates can still be extracted for $\phi$ and as from a set of measurements $\sigma_a^2$ by first constructing the joint probability $$p(\{x_i\}, \{y_i\} \mid \phi, \sigma_a^2, \sigma_b^2) = \prod_{j=2}^{N}\left[\frac{\exp\left(-\frac{a_j^2}{2\sigma_a^2}\right)}{\sqrt{2\pi\sigma_z^2}}\right]\prod_{j=1}^{N}\left[\frac{\exp\left(-\frac{b_j^2}{2\sigma_b^2}\right)}{\sqrt{2\pi\sigma_b^2}}\right] \tag{29}$$

$$= \prod_{j=2}^{N}\left[\frac{\exp\left(-\frac{(x_j - \phi x_{j-1})^2}{2\sigma_a^2}\right)}{\sqrt{2\pi\sigma_z^2}}\right]\prod_{j=1}^{N}\left[\frac{\exp\left(-\frac{(y_j - x_j)^2}{2\sigma_b^2}\right)}{\sqrt{2\pi\sigma_b^2}}\right]. \tag{30}$$

The probability density for a given set of measurements is obtained by integrating over all trajectories, $$p(\{y_j\} \mid \phi, \sigma_a^2, \sigma_b^2) = \int p(\{x_j\}, \{y_j\} \mid \phi, \sigma_a^2, \sigma_b^2) dx_1 \ldots dx_N \tag{31}$$

$$= \frac{(2\pi\sigma_a^2\sigma_b^2)^{-\frac{N-1}{2}}}{\sqrt{\sigma_b^2 \det(A_\phi)}} \exp\left(-\frac{1}{2\sigma_b^2}(\vec{y})^T\left[I - \frac{A_\phi^{-1}}{\sigma_b^2}\right]\vec{y}\right),$$

where $\vec{y} = (y_1, \ldots, y_N)$, $(\vec{y})^T$ is its transpose, I is the N×N identity matrix, and $$A_\phi = \frac{I}{\sigma_b^2} + \frac{M_\phi}{\sigma_a^2}, \tag{32}$$

with the memory tensor $$M_\phi = \begin{pmatrix} \phi^2 & -\phi & 0 & 0 & \cdots & 0 \\ -\phi & 1+\phi^2 & -\phi & 0 & \cdots & \vdots \\ 0 & -\phi & 1+\phi^2 & -\phi & \cdots & \vdots \\ 0 & 0 & -\phi & \ddots & \cdots & \vdots \\ \vdots & \vdots & \cdots & -\phi & 1+\phi^2 & -\phi \\ 0 & 0 & \cdots & 0 & -\phi & -1 \end{pmatrix}. \tag{33}$$

Calculating the determinant, $\det(A_\phi)$, and inverse $A_\phi^{-1}$, is greatly facilitated if time translation invariance is artificially imposed by replacing $M_\phi$ with the $(N+1) \times (N+1)$ matrix $$\hat{M}_\phi = \begin{pmatrix} 1+\phi^2 & -\phi & 0 & 0 & \ldots & -\phi \\ -\phi & 1+\phi^2 & -\phi & 0 & \ldots & \vdots \\ 0 & -\phi & 1+\phi^2 & -\phi & \ldots & \vdots \\ 0 & 0 & -\phi & \ddots & \ldots & \vdots \\ \vdots & \vdots & \ldots & -\phi & 1+\phi^2 & -\phi \\ -\phi & 0 & \ldots & 0 & -\phi & 1+\phi^2 \end{pmatrix} \quad (34)$$

Physically, this involves imparting an impulse, $\alpha_{N+1}$, that translates the particle from its last position, $x_N$, to its first, $x_1$. Because diffusion in a potential well is a stationary process, the effect of this change decays as $1/N$ in the number of measurements, and so is less important than other sources of error.

With this approximation, the determinant and inverse of $A_\phi$ are given by $$\det(A_\phi) = \prod_{n=1}^{N} \left\{ \frac{1}{\sigma_b^2} + \frac{1}{\sigma_a^2}\left[1 + \phi^2 - 2\phi\cos\left(\frac{2\pi n}{N}\right)\right] \right\} \quad (35)$$

and $$(A_\phi^{-1})_{\alpha\beta} = \frac{1}{N} \sum_{n=1}^{N} \frac{\sigma_a^2 \sigma_b^2 \exp\left(i\frac{2\pi}{N}n(\alpha-\beta)\right)}{\sigma_a^2 + \sigma_b^2\left[1 + \phi^2 - 2\phi\cos\left(\frac{2\pi n}{N}\right)\right]}, \quad (36)$$

so that the conditional probability for the measured trajectory, $\{y_j\}$, is $$p(\{y_j\}|\phi, \sigma_a^2, \sigma_b^2) = (2\pi)^{-\frac{N}{2}} \exp\left(-\frac{1}{2\sigma_b^2}\sum_{n=1}^{N} y_n^2\right) \times \quad (37)$$

$$\prod_{n=1}^{N} \left\{\sigma_a^2 + \sigma_b^2\left[1 + \phi^2 - 2\phi\cos\left(\frac{2\pi n}{N}\right)\right]\right\}^{-\frac{1}{2}} \times$$

$$\exp\left(\frac{1}{2\sigma_b^2} \frac{1}{N} \sum_{m=1}^{N} \frac{y_m^2 \sigma_a^2}{\sigma_a^2 + \sigma_b^2\left[1 + \phi^2 - 2\phi\cos\left(\frac{2\pi m}{N}\right)\right]}\right).$$

This can be inverted to obtain the likelihood function for $\phi$, $\sigma_a^2$ and $\sigma_b^2$:

$$L(\phi, \sigma_a^2, \sigma_b^2 | \{y_i\}) = \quad (38)$$

$$-\frac{N}{2}\ln 2\pi - \frac{1}{2\sigma_b^2}\sum_{j=n}^{N} y_n^2 - \frac{1}{2}\sum_{n=1}^{N} \ln\left(\sigma_a^2 + \sigma_b^2\left[1 + \phi^2 - 2\phi\cos\left(\frac{2\pi n}{N}\right)\right]\right) +$$

$$\frac{\sigma_a^2}{2\sigma_b^2} \frac{1}{N} \sum_{n=1}^{N} \frac{y_n^2 \sigma_a^2}{\sigma_a^2 + \sigma_b^2\left[1 + \phi^2 - 2\phi\cos\left(\frac{2\pi n}{N}\right)\right]}.$$

Best estimates $(\hat{\phi}, \hat{\sigma}_a^2, \hat{\sigma}_b^2)$ for the parameters $(\phi, \sigma_a^2, \sigma_b^2)$ are solutions of the coupled equations $$\frac{\partial L}{\partial \phi} = \frac{\partial L}{\partial \sigma_a^2} = \frac{\partial L}{\partial \sigma_b^2} = 0. \quad (39)$$

Eq. (39) can be solved in closed form if $\sigma_b^2 = 0$. In this case, the best estimates for the parameters are $$\hat{\phi}_0 = \frac{c_1}{c_2}, \text{ and} \quad (40)$$

$$\hat{\sigma}_{a0}^2 = c_0\left[1 - \left(\frac{c_1}{c_2}\right)^2\right], \quad (41)$$

where $$c_m = \frac{1}{N}\sum_{j=1}^{N} y_j y(j+m) \bmod N \quad (42)$$

is the barrel autocorrelation of $\{y_j\}$ at lag m. The associated statistical uncertainties are $$\Delta\hat{\phi}_0 = \sqrt{\frac{\hat{\sigma}_{a0}^2}{Nc_0}}, \text{ and} \quad (43)$$

$$\Delta\hat{\sigma}_{a0}^2 = \hat{\sigma}_{a0}^2 \sqrt{\frac{2}{N}}. \quad (44)$$

In the absence of measurement errors, just two descriptors, $c_0$ and $c_1$, contain all of the information that can be extracted from the time series regarding $\phi$ and $\sigma_a^2$. These are examples of sufficient statistics that completely specify the system's dynamics.

The analysis is less straightforward when $\sigma_b^2 \neq 0$ because Eqs. (39) no longer are simply separable. The system of equations can be solved at least approximately provided the measurement error $\sigma_b^2$ is smaller than $\sigma_a^2$. In this case, the best estimates for the parameters can be expressed in terms of the error-free estimates as $$\hat{\phi} \approx \hat{\phi}_0\left\{1 + \frac{\sigma_b^2}{\hat{\sigma}_{a0}^2}\left[1 - \hat{\phi}_0^2 + \frac{c_2}{c_0}\right]\right\}, \text{ and} \quad (45)$$

$$\hat{\sigma}_a^2 \approx \hat{\sigma}_{a0}^2 - \frac{\sigma_b^2}{\hat{\sigma}_{a0}^2} c_0\left[1 - 5\hat{\phi}_0^4 + 4\hat{\phi}_0^2 \frac{c_2}{c_0}\right], \quad (46)$$

to first order in $\sigma_b^2/\sigma_a^2$, with statistical uncertainties propagated in the conventional manner. The sufficient statistics at this level of approximation include just one additional moment, $c_2$. Expansions to higher order in $\sigma_b^2/\sigma_a^2$ require additional correlations to be completed, and the exact solution requires correlations at all lags m. Such a complete analysis offers no computational benefits over power spectral analysis, for example. It does, however, provide a systematic approach to estimating experimental uncertainties. If the measurement error is small enough for Eqs. (45) and (46) to apply, the computational savings can be substantial, and the amount of data required to achieve a desired level of accuracy in the physically relevant quantities, $\kappa$ and $\gamma$, can be reduced dramatically.

The errors in locating colloidal particles' centroids can be calculated from knowledge of the images' signal to noise ratio and the optical train's magnification. Centroid resolutions of 10 nm or better can be routinely attained for micrometer-scale colloidal particles in water using conventional bright-field imaging. In practice, however, mechanical vibrations, video jitter and other processes may increase the measurement error by amounts that can be difficult to independently quantify. Quite often, the overall measurement error is most easily assessed by increasing the laser power to the optical traps to minimize the particles' thermally driven motions. In this case, $y_j \approx b_j$, and the measurement error's variance $\sigma_b^2$ can be estimated directly.

$$\frac{\kappa}{k_B T} = \frac{1 - \hat{\phi}^2}{\hat{\sigma}_a^2}, \text{ and} \tag{47}$$

$$\frac{\gamma}{k_B T \Delta t} = -\frac{1 - \hat{\phi}^2}{\sigma_a^2 \ln \hat{\phi}}, \tag{48}$$

with error estimates, $\Delta \kappa$ and $\Delta \gamma$, given by $$\left(\frac{\Delta \kappa}{\kappa}\right)^2 = \left(\frac{\Delta \hat{\sigma}_a^2}{\hat{\sigma}_a^2}\right)^2 + \left(\frac{2 \hat{\phi}^2}{1 - \hat{\phi}^2}\right)^2 \left(\frac{\Delta \hat{\phi}}{\hat{\phi}}\right)^2 \tag{49}$$

$$\left(\frac{\Delta \gamma}{\gamma}\right)^2 = \left(\frac{\Delta \hat{\sigma}_a^2}{\hat{\sigma}_a^2}\right)^2 + \left(\frac{2 \hat{\phi}^2}{1 - \hat{\phi}^2} - \frac{1}{\ln \hat{\phi}}\right)^2 \left(\frac{\Delta \hat{\phi}}{\hat{\phi}}\right)^2. \tag{50}$$

If the measurement interval $\Delta t$ is much longer than the viscous relaxation time $\tau = \gamma / \kappa$, then $\phi$ vanishes and the error in the drag coefficient diverges. Conversely, if $\Delta t$ is much smaller than $\tau$, then $\phi$ approaches unity and both errors diverge. Consequently, this approach to trap characterization does not benefit from excessively fast sampling. Rather, it relies on accurate particle tracking to minimize $\Delta \hat{\phi}$ and $\Delta \hat{\sigma}_a^2$. For trap-particle combinations with viscous relaxation tunes of several milliseconds or longer and typical particle excursions of at least 10 nm, digital video microscopy provides both the temporal and spatial resolution needed to completely characterize optical traps. This approach also lends itself to simultaneous characterization of multiple traps, which is not possible with conventional methods.

In the event that measurement errors can be ignored ($\sigma_b^2 \ll \sigma_a^2$), the physically relevant quantities can be obtained as:

$$\frac{\kappa_0}{k_B T} = \frac{1}{c_0} \left[ 1 \pm \sqrt{\frac{2}{N} \left( 1 + \frac{2 c_1^2}{c_0^2 - c_1^2} \right)} \right] \tag{51}$$

$$\frac{\gamma 0}{k_B T \Delta t} = \frac{1}{c_0 \ln\left(\frac{c_0}{c_1}\right)} \left( 1 \pm \frac{\Delta \gamma 0}{\gamma 0} \right), \text{ where} \tag{52}$$

$$N \left(\frac{\Delta \gamma_0}{\gamma_0}\right)^2 = 2 + \frac{1}{c_0^2 - c_1^2} \left[ \frac{c_1^2 - 2 c_1 c_0 \ln\left(\frac{c_0}{c_1}\right) - c_0^2}{c_0 \ln\left(\frac{c_0}{c_1}\right)} \right]^2.$$

These results are not reliable if $c_1 \lesssim \sigma_b^2$, which when the sampling interval $\Delta t$ is much longer or shorter than the viscous relaxation time, $\tau$. Accurate estimates for $\kappa$ and $\gamma$ still may be obtained in this case by applying Eqs. (45) and (46) or their generalizations.

Optimal statistical analysis offers insights not only into the traps' properties, but also into the properties of the trapped particles and the surrounding medium. For example, if a spherical probe particle is immersed in a medium of viscosity $\eta$ far from any bounding surfaces, its hydrodynamic radius a can be assessed from the measured drag coefficient using the Stokes result $\gamma = 6\pi \eta a$. The viscous drag coefficients also provide insights into the particles' coupling to each other and to their environment. The independently assessed values of the traps' stiffness then can serve as a self-calibration in microrheological measurements and in measurements of colloidal many-body hydrodynamic coupling. In cases where the traps themselves must be accurately calibrated, knowledge of the probe particles' differing properties gauged from measurements of $\gamma$ can be used to distinguish variations in the traps' intrinsic properties from variations due to differences among the probe particles. The apparent width and depth of the potential energy well a particle experiences when it encounters an optical trap depends on its size in a manner that can be inverted at least approximately.

These measurements, moreover, can be performed rapidly enough, even at conventional video sampling rates, to permit real-time adaptive optimization of the traps' properties. Each trap's stiffness is roughly proportional to its brightness. Therefore, if the m-th trap in an array is intended to receive a fraction $|\alpha_m|^2$ of the projected light, then its stiffness should satisfy $$\frac{\kappa_m}{\sum_{i=1}^{N} \kappa_i} = |\alpha_m|^2 \tag{53}$$

Any departure from this due to fixed instrumental deficiencies can be corrected by modifying the design amplitudes, $$\alpha_m \rightarrow \alpha_m \sqrt{\frac{\sum_{i=1}^{N} \kappa_i}{\kappa_m}}, \tag{54}$$

and recalculating the CGH.

As a practical demonstration of the utility of the present invention, a challenging pattern of optical traps is calculated, projected, and characterized in a quasiperiodic array. The traps are formed with a 100×NA 1.4 S-Plan Apo oil immersion objective lens mounted in a Nikon TE-2000U inverted optical microscope. The traps are powered by a Coherent Verdi frequency-doubled diode-pumped solid state laser operating at a wavelength of 532 nm. Computer-generated phase holograms are imprinted on the beam with a Hamamatsu X8267-16 parallel-aligned nematic liquid crystal spatial light modulator (SLM). This SLM can impose phase shifts up to $2^\pi$ radians at each pixel in a 760×760 array. The face of the SLM is imaged onto the objective's 5 mm diameter input pupil using relay optics designed to minimize aberrations. The beam is directed into the objective with a dichroic beamsplitter (Chroma Technologies), which allows images to pass through to a low-noise charge-coupled device (CCD) camera (NEC TI-324AII). The video stream is recorded as uncompressed digital video with a Pioneer digital video recorder (DVR) for processing.

Figure 4A:
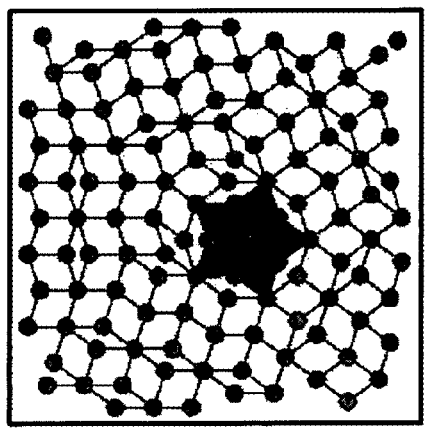
FIG. 4(a) is a design for 119 identical optical traps in a two-dimensional quasiperiodic array.
Figure 4B:
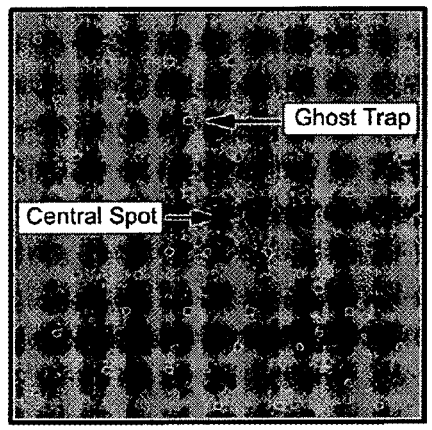
FIG. 4(b) shows the trapping pattern projected without optimizations using the adaptive-additive algorithm.
Figure 4C:
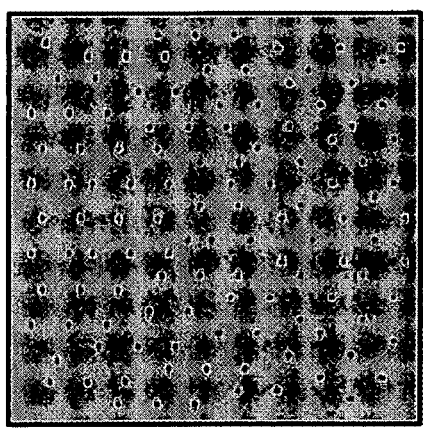
FIG. 4(c) shows the trapping pattern projected with optimized optics and an adaptively corrected direct search algorithm.

FIG. 4(a) shows the intended planar arrangement of 119 holographic optical traps. Even after adaptive-additive refinement, the hologram resulting from simple superposition with random phase fares poorly for this aperiodic pattern. FIG. 4(b) shows the intensity of light reflected by a front-surface mirror placed in the sample plane. This image reveals several undesirable defects including extraneous ghost traps, an exceptionally bright central spot, and large variability in intensity. Imaging photometry on this and equivalent images produced with different random relative phases for the beams yields a typical root-mean-square variation of more than 50 percent in the projected traps' brightness. The image in FIG. 4(c) was produced using the modified optical train and the direct search algorithm described earlier. This image suffers from none of these defects exemplified in FIG. 4(b). Both the ghost traps and the central spot are suppressed, and the apparent relative brightness variations are smaller than 5 percent, an improvement by a factor of ten.

Figure 4D:
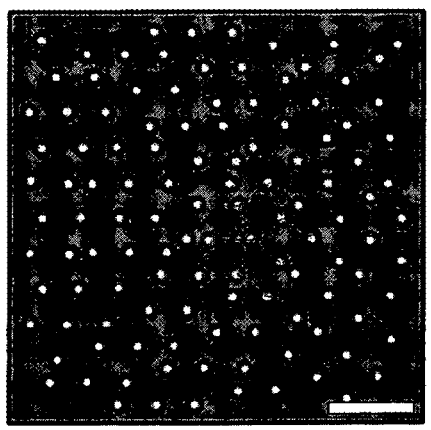
FIG. 4(d) shows a bright-field image of colloidal silica spheres 1.58 $\mu m$ in diameter dispersed in water and organized in the optical trap array, where the scale bar indicates 10 $\mu m$.

The real test of these optical tweezers, however, is their performance at trapping particles. FIG. 4(d) shows 119 colloidal silica spheres, 2a=1.6±0.2 μm pin in diameter, dispersed in water at T=40° C. The viscosity is roughly η=1 cP. The dispersion was sealed into a slit pore formed by sealing the edges of a glass #1.5 cover slip to the surface of a glass microscope slide. The array of traps was focused roughly 10 μm above the inner surface of the coverslip in a layer roughly 40 μm thick. The traps were separated by 7 μm, so that hydrodynamic coupling among the spheres should modify their individual drag coefficients by no more than ten percent, which is comparable to the effect of the nearby wall. Imaging spheres in smaller trapping patterns at a projected power of 30 mW per trap suggests that the overall measurement error for the particles' centroids is $\sigma_b^2 = 5$ nm$^2$.

Reducing the laser power to 2 mW per trap frees the particles to explore the traps' potential energy wells. The particles were tracked both along the line of traps (the $\hat{x}$ direction) and perpendicular to it (the $\hat{y}$ direction), and analyzed both coordinates separately, using the methods discussed herein. It was shown that the traps' strengths do indeed vary by more than the typical measurement error, but that the variation is less than 5 percent. If the variations were larger, information from this measurement could be used to adjust the amplitudes $\alpha_m$ in Eq. (5) to correct for fixed variations in the optical train's performance.

B. Flux Reversal in Symmetric Optical Thermal Ratchets

The ability to rectify Brownian forces with spatially extended time-varying light fields creates new opportunities for leveraging the statistical properties of thermal ratchets and to exploit them by their interesting and useful properties for practical applications. In these embodiments a one-dimensional thermal ratchet implemented with the holographic optical trapping technique applied to fluid-borne colloidal spheres. The complementary roles of global spatiotemporal symmetry and local dynamics are presented in relation to establishing the direction of ratchet-induced motion and also present applications in higher-dimensional systems.

Thermal ratchets employ time-varying potential energy landscapes to break the spatiotemporal symmetry of thermally equilibrated systems. The resulting departure from equilibrium takes the form of a directed flux of energy or materials, which can be harnessed for natural and practical applications. Unlike conventional macroscopic machines whose efficiency is reduced by random fluctuations, thermal ratchets actually can utilize noise to operate. They achieve their peak efficiency when their spatial and temporal evolution is appropriately matched to the scale of fluctuations in the heat bath.

Most thermal ratchet models involve locally asymmetric space-filling potential energy landscapes, and almost all are designed to operate in one dimension. Most practical implementations have exploited microfabricated structures such as interdigitated electrode arrays, quantum dot arrays, periodic surface textures, or microfabricated pores for hydrodynamic drift ratchets. Previous optical implementations have used a rapidly scanned optical tweezer to create an asymmetric one-dimensional potential energy landscape in a time-averaged sense, or a time-varying dual-well potential with two conventional optical traps.

This embodiment includes a broad class of optical thermal ratchets that exploit the holographic optical tweezer technique to create large-scale dynamic potential energy landscapes. This approach permits detailed studies of the interplay of global spatiotemporal symmetry and local dynamics in establishing both the magnitude and direction of ratchet-induced fluxes. It also provides for numerous practical applications.

Figure 5A:
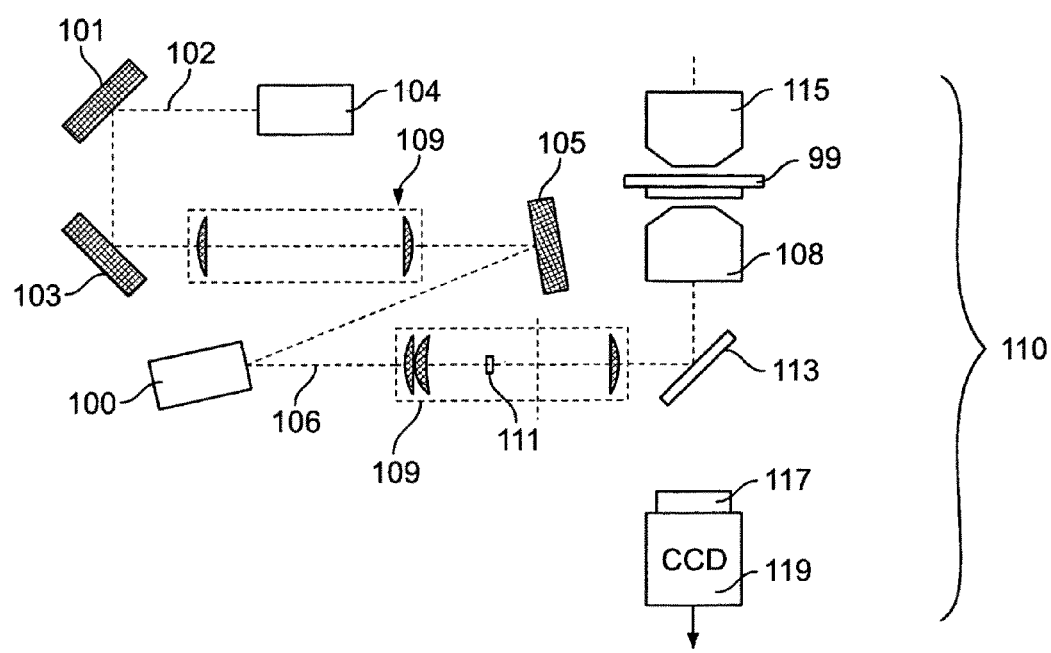
FIG. 5(a) is a schematic representation of a holographic thermal ratchet embodiment.

Holographic optical tweezers use computer-generated holograms to project large arrays of single-beam optical traps. One implementation, shown schematically in FIG. 5(a), uses a liquid crystal spatial light modulator 100 (SLM) (Hamamatsu X7550 PAL-SLM) to imprint phase-only holograms on the wavefronts of a laser beam 102 from a frequency-doubled diode-pumped solid state laser 104 operating at 532 nm (Coherent Verdi). This SLM 100 can vary the local phase, $\phi(r)$, between 0 and $2\pi$ radians at each position r in a 480×480 grid spanning the beam's wavefront. A modulated beam 106 is relayed to the input pupil of a 100×NA 1.4 SPlan Apo oil immersion objective lens 108 mounted in an inverted optical microscope 110 (Zeiss S-100TV). The objective lens 108 focuses the light into a pattern of optical traps that can be updated in real time by transmitting a new phase pattern to the SLM.

Figure 5B:
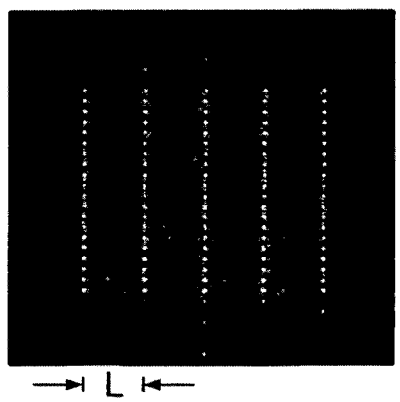
FIG. 5(b) shows focused light from a typical HOT pattern.

FIG. 5(b) shows the focused light, $l(\vec{r})$, from a typical pattern of holographic optical traps, which is imaged by placing a front-surface mirror on the sample stage and collecting the reflected light with the objective lens 108. Each focused spot of light in this 20×5 array constitutes a discrete optical tweezer, which acts as a spatially symmetric three-dimensional potential energy well for a micrometer-scale object. FIG. 5(b) shows an aqueous dispersion of 1.53 μm diameter colloidal silica spheres (Bangs Laboratories, lot number 5328) interacting with this pattern of traps at a projected laser power of 2.5 mW/trap.

Each potential well may be described as a rotationally symmetric Gaussian potential well. Arranging the traps in closely spaced manifolds separated by a distance L creates a pseudo-one-dimensional potential energy landscape, V(x), which can be modeled as $$V(x) = -V_0 \sum_{n=-N}^{N} \exp\left(-\frac{(x-nL)^2}{2\sigma^2}\right). \tag{55}$$

Figure 5C:
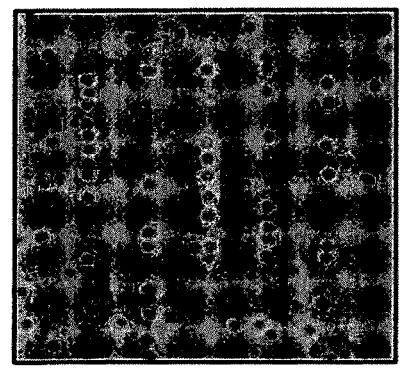
FIG. 5(c) shows an aqueous dispersion of colloidal trapped silica spheres interacting with the HOTs.
Figure 5D:
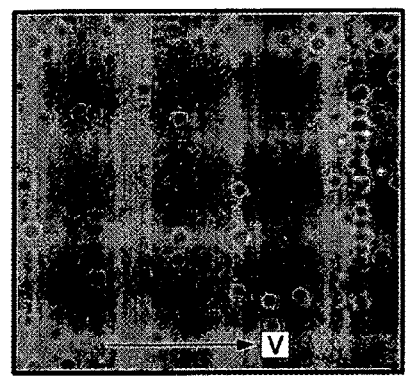
FIG. 5(d) shows the ratchet effect.

The well depth, $V_0$, approaches the thermal energy scale, $\beta^{-1}$, when each optical tweezer is powered with somewhat less than 1 mW of light. The holographically projected traps' strengths are uniform to within ten percent. Their widths, σ are comparable to the spheres' radii. With the traps powered by 3 mW, diffusing particles are rapidly localized by the first optical tweezer they encounter, as can be seen from the center photograph in FIG. 5(c).

The potential energy landscape created by a holographic optical tweezer array differs from most ratchet potentials in two principal respects. In the first place, the empty spaces between manifolds comprise large force-free regions. This contrasts with most models, which employ space-filling landscapes. The landscape can induce motion only if random thermal fluctuations enable particles to diffuse across force-free regions. Secondly, the landscape is spatially symmetric, both globally and locally. Breaking spatiotemporal symmetry to induce a flux rests, therefore, with the landscape's time evolution. Details of the protocol can determine the nature of the induced motion.

The most straightforward protocols for holographic optical thermal ratchets involve cyclically translating the landscape by discrete fractions of the lattice constant L, with the n-th state in each cycle having duration $T_n$. The motion of a Brownian particle in such a system can be described with the one-dimensional Langevin equation $$\gamma \dot{x}(t) = -V'(x(t) - f(t)) + \xi(t), \quad (56)$$

where y is the particle's viscous drag coefficient, the prime denotes a derivative with respect to the argument, and $\xi(t)$ is a stochastic force representing thermal noise. This white-noise forcing satisfies $\langle \xi(t) \rangle = 0$ and $\langle \xi(t)\xi(s) \rangle = 2(\gamma/\beta)\delta(t-s)$.

The potential energy landscape in our system is spatially periodic:

$$V(x+L) = V(x). \quad (57)$$

The discrete displacements in an N-state cycle, furthermore, also are described by a periodic function $f(t)$, with period $$T = \sum_{n=1}^{N} T_n.$$

That a periodically driven, symmetric and spatially periodic potential can rectify Brownian motion to generate a directed flux might not be immediately obvious. Directed motion in time-evolving landscapes is all but inevitable, with flux-free operation being guaranteed only if $V(x)$ and $f(t)$ satisfy specific conditions of spatiotemporal symmetry, $$V(x) = V(-x), \text{ and } \dot{f}(t) = -\dot{f}(t+T/2), \quad (58)$$

and spatiotemporal supersymmetry, $$V(x) = -V(x+L/2), \text{ and } \dot{f}(t+\Delta t) = -\dot{f}(-t), \quad (59)$$

for at least one value of $\Delta t$. The dot in Eqs. (58) and (59) denotes a time derivative. Two distinct classes of one-dimensional optical thermal ratchets that exploit these symmetries in different ways are presented herein. The first results in directed diffusion except for a particular operating point, at which Eq. (58) is satisfied. The second has a point of flux-free operation even though Eqs. (58) and (59) are always violated. In both cases, the vanishing point signals a reversal of the direction of the induced flux.

The simplest optical ratchet protocol involves a two-state cycle, $$f(t) = \begin{cases} 0, & 0 \leq (t \bmod T) < T_1 \\ \dfrac{L}{3} & T_1 \leq (t \bmod T) < T \end{cases} \quad (60)$$

This protocol explicitly satisfies the symmetry condition in Eq. (58) when the two states are of equal duration, $T_1 = T_2 = T/2$. This particular operating point therefore should create a flux-free nonequilibrium steady-state, with particles being juggled back and forth between neighboring manifolds of traps. Breaking spatiotemporal symmetry by setting $T_1 \neq T_2$ does not guarantee a flux, but at least creates the possibility.

Figure 6:
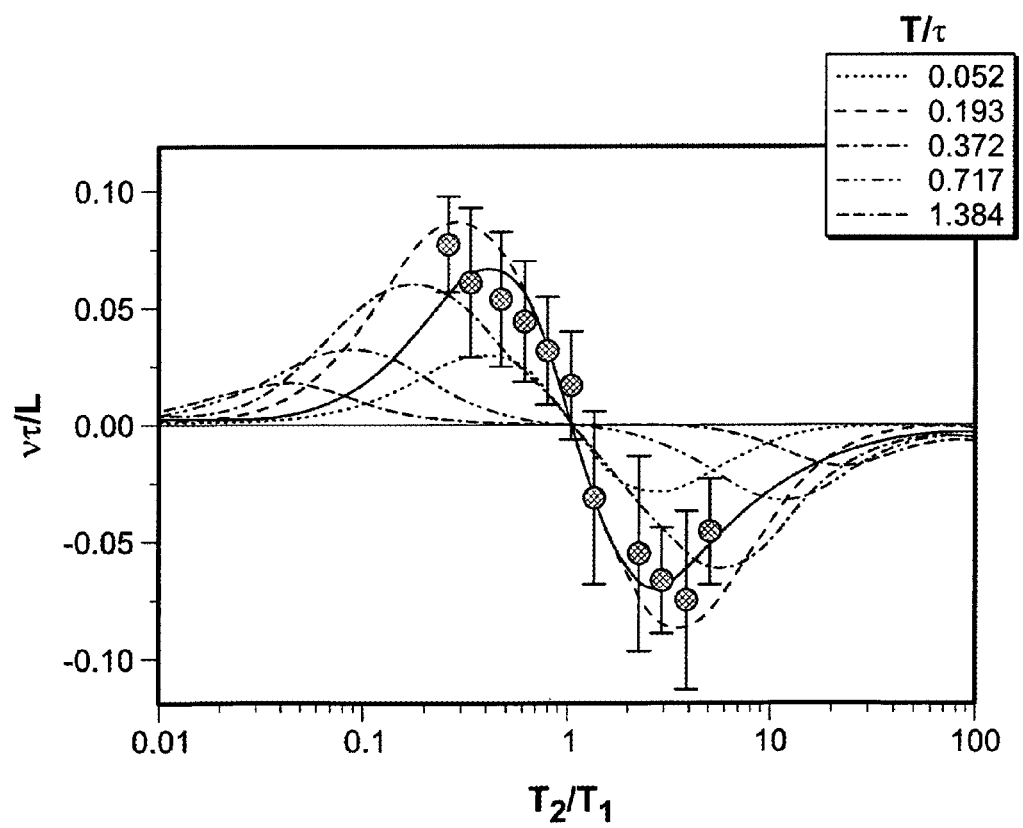
FIG. 6 shows flux induced by a two-state holographic optical ratchet.

FIG. 6 presents flux induced by a two-state holographic optical ratchet. Discrete points show measured mean drift speed as a function of $T_2$ for $T_1 = 3$ sec. The solid curve is a fit to the data for $\beta V_0 = 2.75$ and $\sigma = 0.65$ μm. Other curves show how the induced drift depends on $T/\tau$, with optimal flux obtained for $T/\tau = 0.193$.

The data in FIG. 6 demonstrate that this possibility is borne out in practice. The discrete points in FIG. 6 show the measured average drift velocity, v, for an ensemble of colloidal silica spheres 1.53 μm in diameter dispersed in a 40 μm thick layer of water between a coverslip and a microscope slide. The spheres are roughly twice as dense as water and rapidly sediment into a free-floating layer above the coverslip. The holographic optical tweezer array was projected into the layer's midplane to minimize out-of-plane fluctuations, with an estimated power of 1 mW/trap. Roughly 30 spheres were in the trapping domain at any time, so that reasonable statistics could be amassed in 10 minutes despite the very large fluctuations inherent in thermal ratchet operation. This number is small enough, moreover, to minimize the rate of collisions among the particles.

Given the spheres' measured diffusion coefficient of $D = 0.33$ μm²/sec., the time required to diffuse the inter-manifold separation of $L = 5.2$ μm is $\tau = L^2/(2D) = 39$ sec. This establishes a natural velocity scale, $L/\tau$, in which v is presented. These data were acquired with $T_1 = 3$ sec. and $T_2$ varying from 0.8 sec to 14.7 sec.

As anticipated, the ratchet-induced flux vanishes at the point of spatiotemporal symmetry, $T_2 = T_1$, and is non-zero otherwise. The vanishing point signals a reversal in the direction of the drift velocity, with particles being more likely to advance from the wells in the longer-lived state toward the nearest manifold in the shorter-lived state. This trend can be understood as resulting from the short-duration state's biasing the diffusion of particles away from their localized distribution in the long-lived state.

To make this qualitative argument more concrete, it is possible to calculate the steady-state velocity for particles in this system by considering the evolution of the probability density $\rho(x,t)$ for finding a particle within dx of position x at time t. The Fokker-Planck equation associated with Eq. (2) is:

$$\frac{\partial \rho(x,t)}{\partial t} = D\left[\frac{\partial^2}{\partial x^2}\rho(x,t) + \beta\frac{\partial}{\partial x}\{\rho(x,t)V'(x-f(t))\}\right], \quad (61)$$

where the prime denotes a derivative with respect to the argument. Equation (61) is formally solved by the master equation $$\rho(x,t+T) = \int P(x,T|x_0,0)\rho(x_0,t)dx_0 \quad (62)$$

for the evolution of the probability density, with the propagator $$P(x,t|x_0,0) = \exp\left(\int^t L(x,t')dt'\right)\delta(x-x_0), \quad (63)$$

describing the transfer of particles from $x_0$ to x under the Liouville operator $$L(x,t) = D\left(\frac{\partial^2}{\partial x^2} + \beta\frac{\partial}{\partial x}V'(x-f(t))\right). \quad (64)$$

From Eq. (62), it follows that the steady-state particle distribution ρ(x) is an eigenstate of the propagator, $$\rho(x) = \int P(x,T|x_0,0)\rho(x_0)dx_0, \quad (65)$$

associated with one complete cycle. The associated steady-state flux is $$v = \int \frac{x-x_0}{T}\rho(x_0)P(x,T|x_0,0)dx\,dx_0. \quad (66)$$

Figure 7A:
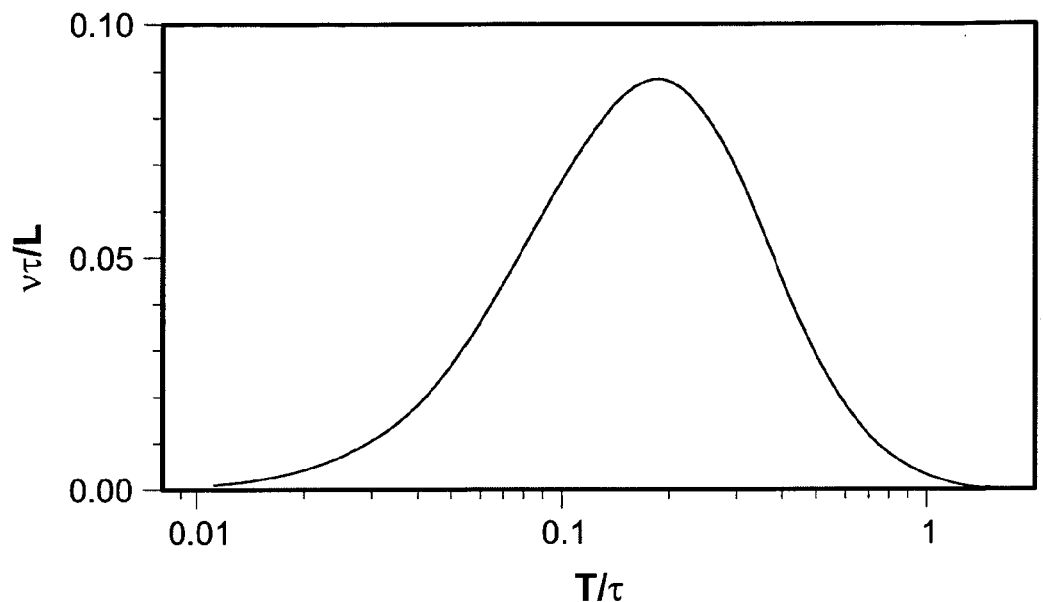
FIG. 7(a) shows stochastic resonance in the two-state optical thermal ratchet for $\tau/L=0.125$.
Figure 7B:
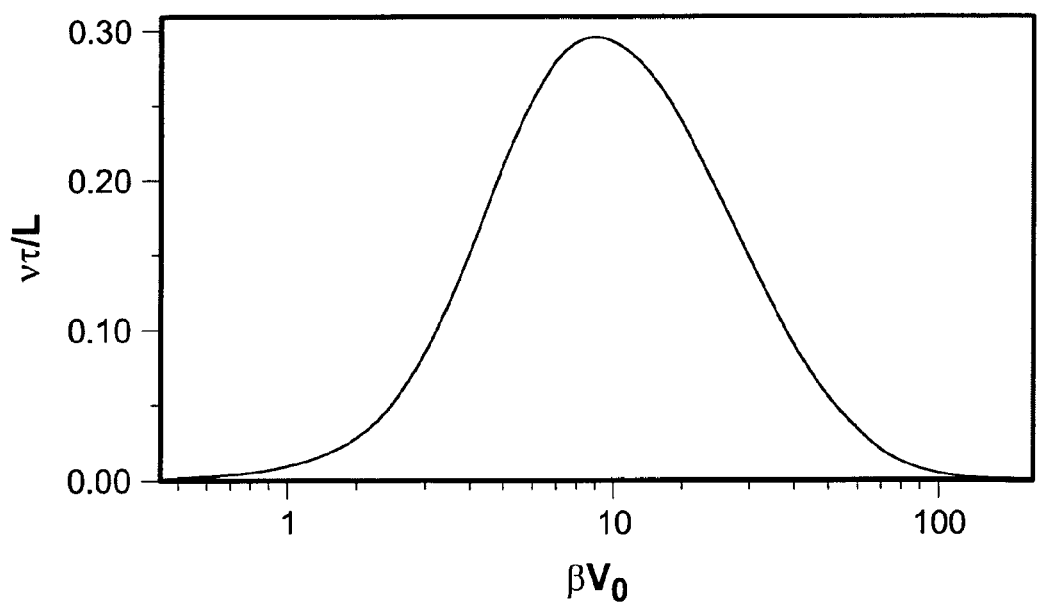
FIG. 7(b) shows dependence on well depth for the optimal angle rate $\tau/\pi=0.193$ and duty cycle.

FIG. 7(a) presents Stochastic resonance in the two-state optical thermal ratchet for σ/L=0.125 with dependence on cycle period T in units of the diffusive time scale τ for βV₀=2.5 at the optimal duty cycle $T_2/T_1$=0.3. FIG. 7(b) presents dependence on well depth for the optimal cycle rate $T_2/T_1$=0.193 and duty cycle.

The solid curve in FIG. 6 is a fit of Eq. (66) to the measured particle fluxes for βV₀=2.5 and σ=0.65 μm. The additional curves in FIG. 6 show how ν varies with $T_2/T_1$ for various values of T/τ for these control parameters. The induced flux, ν, plotted in FIG. 7(a), falls off as 1/T in the limit of large T because the particles spend increasingly much of their time localized in traps. It also vanishes in the opposite limit because the diffusing particles cannot keep up with the landscape's evolution. The optimal cycle period at T/τ≈0.2 constitutes an example of stochastic resonance. Although a particle's diffusivity controls the speed with which it traverses the ratchet, its direction is uniquely determined by $T_2/T_1$.

No flux results if the traps are too weak. Increasing the potential wells' depths increases the maximum attainable flux, but only up to a point. If the traps are too strong, particles also become localized in the short-lived state, and the ratchet approaches a deterministic flux-free limit in which particles simply hop back and forth between neighboring manifolds. This behavior is shown in FIG. 7(b).

Different objects exposed to the same time-evolving optical intensity pattern experience different values of V₀ and σ, and also can have differing diffusive time scales, τ. Such differences establish a dispersion of mean velocities for mixtures of particles moving through the landscape that can be used to sorting the particles. Despite this method's symmetry and technical simplicity, however, the two-state protocol is not the most effective platform for such practical applications. A slightly more elaborate protocol yields a thermal ratchet whose deterministic limit transports material rapidly and whose stochastic limit yields flux reversal at a point not predicted by the symmetry selection rules in Eqs. (58) and (59).

In another embodiment, the next step up in complexity and functional richness involves the addition of a third state to the ratchet cycle:

$$f(t) = \begin{cases} 0, & 0 \le (t\bmod T) < \frac{T}{3} \\ \frac{L}{3}, & \frac{T}{3} \le (t\bmod T) < \frac{2T}{3} \\ -\frac{L}{3}, & \frac{2T}{3} \le (t\bmod T) < T \end{cases}. \quad (67)$$

This three-state cycle consists of cyclic displacements of the landscape by one third of a lattice constant. Unlike the two-state symmetric thermal ratchet, it has a deterministic limit, an explanation of which helps to elucidate its operation in the stochastic limit.

If the width, σ, of the individual wells is comparable to the separation L/3 between manifolds in consecutive states, then a particle localized at the bottom of a well in one state is released near the edge of a well in the next. Provided V₀ is large enough, the particle falls to the bottom of the new well during the T/3 duration of the new state. This process continues through the sequence of states, and the particle is transferred deterministically forward from manifold to manifold. This deterministic process is known as optical peristalsis, and is useful for reorganizing fluid-borne objects over large areas with simple sequences of generic holographic trapping patterns.

Assuming the individual traps are strong enough, optical peristalsis transfers objects forward at speed ν=L/T. If, on the other hand, βV₀<1, particles can be thermally excited out of the forward-going wave of traps and so will travel forward more slowly. This is an example of a deterministic machine's efficiency being degraded by thermal fluctuations. This contrasts with the two-state thermal ratchet, which has no effect in the deterministic limit and instead relies on thermal fluctuations to induce motion.

The three-state protocol enters its stochastic regime when the inter-state displacement of manifolds, L/3, exceeds the individual traps' width, σ. Under these conditions, a particle that is trapped in one state is released into the force-free region between traps once the state changes. If the particle diffuses rapidly enough, it might nevertheless fall into the nearest potential well centered a distance L/3 away in the forward-going direction within time T/3. The fraction of particles achieving this will be transferred forward in each step of the cycle. This stochastic process resembles optical peristalsis, albeit with reduced efficiency. There is a substantial difference, however.

An object that does not diffuse rapidly enough to reach the nearest forward-going trap in time T/3 might still reach the trap centered at −L/3 in the third state by time 2T/3. Such a slow-moving object would be transferred backward by the ratchet at velocity ν=−L/(2T). Unlike the two-state ratchet, whose directionality is established unambiguously by the sequence of states, the three-state ratchet's direction appears to depend also on the transported objects' mobility.

Figure 8A:
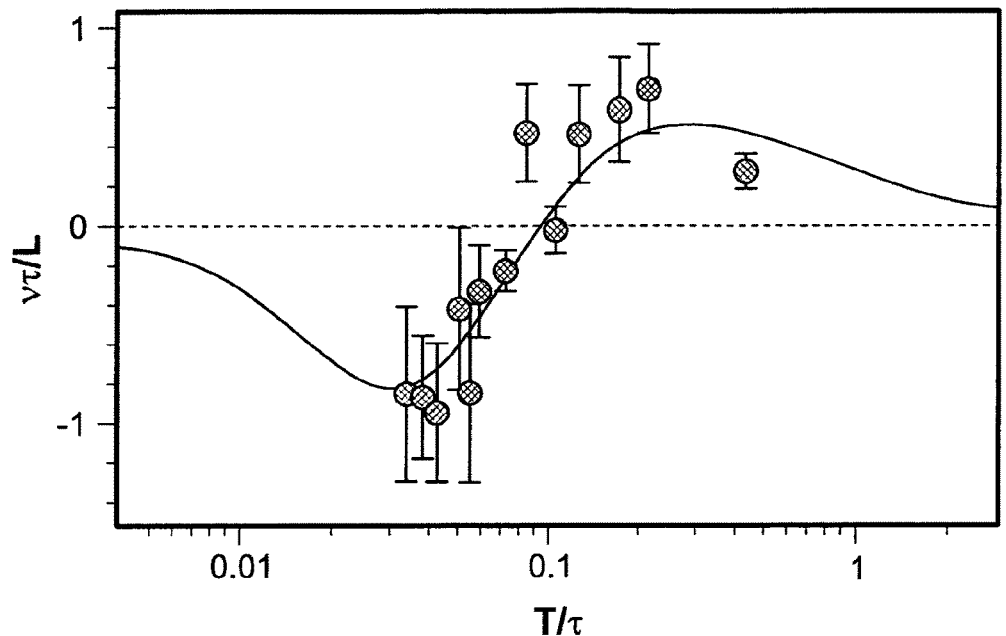
FIG. 8(a) shows flux reversed in a symmetric three-state optical thermal ratchet as a function of cycle period fixed manifold separation.
Figure 8B:
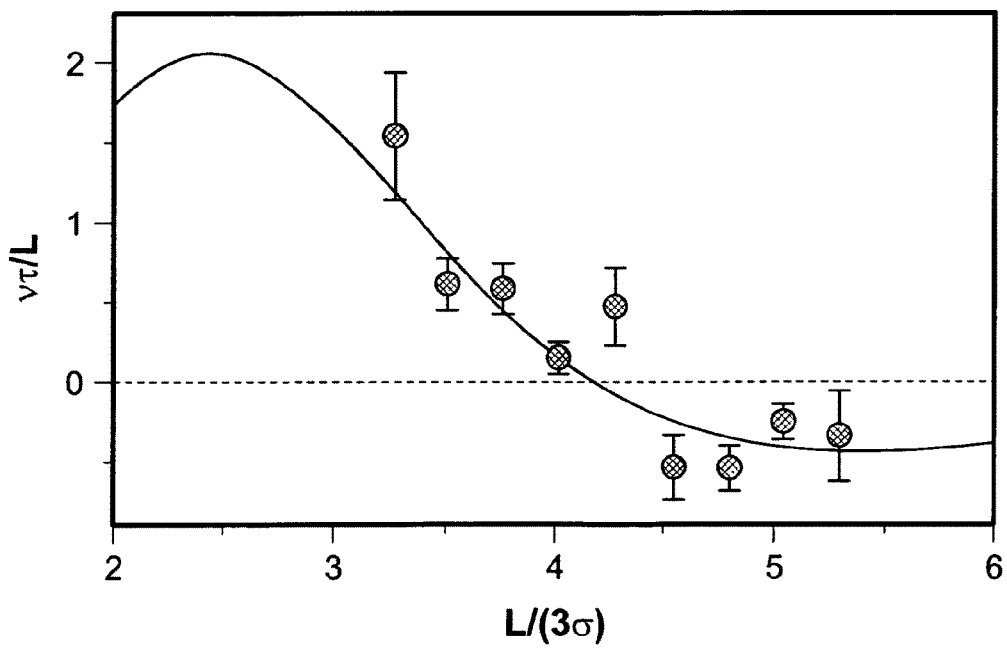
FIG. 8(b) shows this flux reversal as a function of inter-manifold separation L for fixed cycle period T.

FIG. 8(a) presents flux reversal in a symmetric three-state optical thermal ratchet and depicts this as a function of cycle period for fixed inter-manifold separation, L. FIG. 8(b) shows this as a function of inter-manifold separation L for fixed cycle period T.

These observations above are borne out by the experimental observations in FIGS. 8(a) and 8(b). The discrete points in FIG. 8(a) show the measured flux of 1.53 μm diameter silica spheres as a function of the cycle period T with the inter-manifold separation fixed at L=6.7 μm. Flux reversal at T/τ≈0.1 does not result from special symmetry considerations because the spatiotemporal evolution described by Eqs. (55) and (67) violates the conditions in Eqs. (58) and (59) for all values of T. Rather, this reflects a dynamical transition in which rapidly diffusing particles are driven in the forward while slowly diffusing particles drift backward. The origin of this transition in thermal ratchet behavior is confirmed by the observation of a comparable transition induced by varying the inter-manifold separation L for fixed cycle period T, as plotted in FIG. 8(b).

Figure 9:
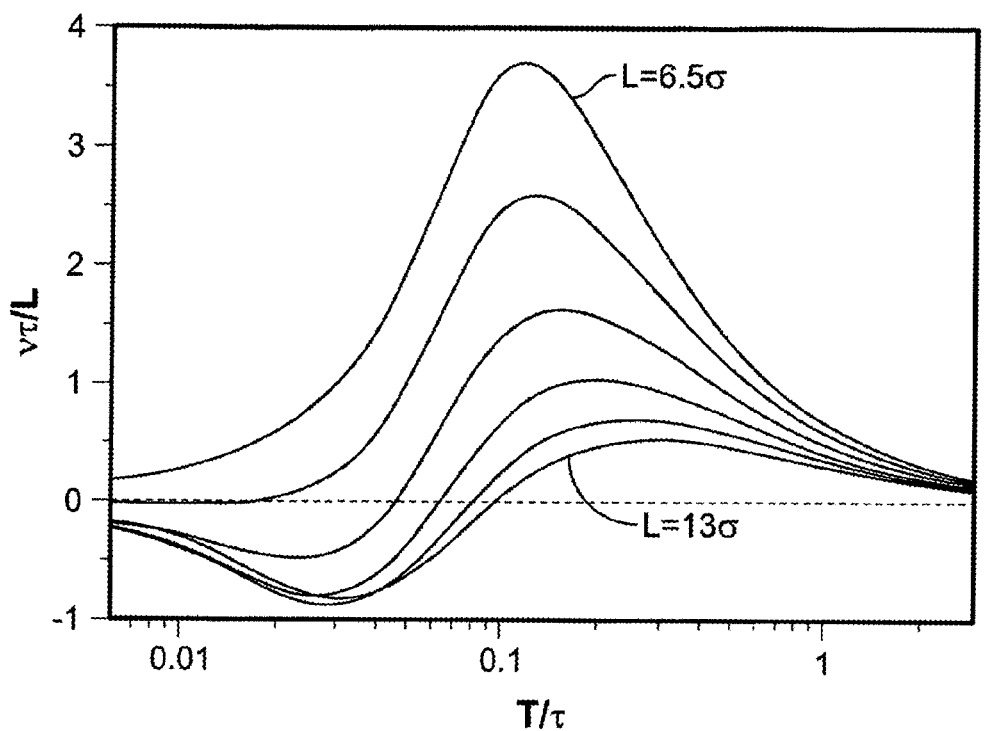
FIG. 9 shows calculated ratchet-induced drift velocity as a function of cycle period for various inter-manifold separation L from a deterministic limit, L=6.55 to the stochastic limit L=130.

FIG. 9 presents calculated ratchet-induced drift velocity as a function of cycle period T for representative values of the inter-manifold separation L ranging from the deterministic limit, L=6.5σ to the stochastic limit L=13σ.

The solid curves in FIGS. 8(a) and 8(b) are fits to Eq. (66) using Eq. (67) to calculate the propagator. The fit values, $\beta V_0 = 8.5 \pm 0.08$ and $\sigma = 0.53 \pm 0.01$ μm are consistent with values obtained for the two-state ratchet, given a higher laser power of 2.5 mW/trap. The crossover from deterministic optical peristalsis with uniformly forward-moving flux at small L to stochastic operation with flux reversal at larger separations is captured in the calculated drift velocities plotted in FIG. 9.

Whereas flux reversal in the two-state ratchet is mandated by the protocol, flux reversal in the three-state ratchet depends on properties of diffusing objects through the detailed structure of the probability distribution ρ(x) under different operating conditions. The three-state optical thermal ratchet therefore provides the basis for sorting applications in which different fractions of a mixed sample are transported in opposite directions by a single time-evolving optical landscape. This builds upon previously reported ratchet-based fractionation techniques which rely on unidirectional motion.

C. Radial Ratchet

The flexibility of holographic optical thermal ratchet implementations and the success of our initial studies of one-dimensional variants both invite consideration of thermal ratchet operation in higher dimensions. This is an area that has not received much attention, perhaps because of the comparative difficulty of implementing multidimensional ratchets with other techniques. As an initial step in this direction, it is possible to introduce a ratchet protocol in which manifolds of traps are organized into evenly spaced concentric rings whose radii advance through a three-state cycle analogous to that in Eq. (67). The probability distribution p(r,t) for a Brownian particle to be found within dr of r at time t under external force $F(r,t) = -\nabla V(r,t)$ satisfies $$\frac{\partial p(r, t)}{\partial t} = D[\nabla^2 p(r, t) - \beta \nabla \cdot \{p(r, t)F(r, t)\}]. \quad (68)$$

If the force depends only on the radial coordinate as $F(r,t) = -\partial V(r,t)\hat{r}$, Eq. (68) reduces to $$\frac{\partial p(r, t)}{\partial t} = D\left[\frac{1}{r}\frac{\partial}{\partial r}\left\{r\frac{\partial}{\partial r}p(r, t)\right\} + \frac{\beta}{r}\frac{\partial}{\partial r}\{rV'(r, t)p(r, t)\}\right]. \quad (69)$$

The probability p(r,t) for a particle to be found between r and r+dr at time t is given by $p(r,t) = 2\pi r \rho(r,t)$. Therefore, the Fokker-Planck equation can be rewritten in terms of ρ(r,t) as $$\frac{\partial \rho(r, t)}{\partial t} = D\left[\frac{\partial^2}{\partial r^2}\rho(r, t) + \beta\frac{\partial}{\partial r}\left\{\left(V'(r, t) - \frac{1}{\beta r}\right)\rho(r, t)\right\}\right]. \quad (70)$$

This, in turn, can be reduced to the form of Eq. (61) by introducing the effective one-dimensional potential $V_{eff}(r,t) \equiv V(r - f(t)) - \beta^{-1} \ln r$. The rest of the analysis follows by analogy to the linear three-state ratchet.

Figure 10A:
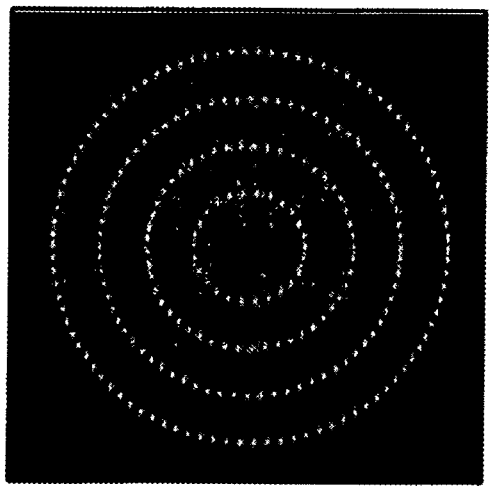
FIG. 10(a) shows fractionation in a radial optical thermal ratchet with patterns of concentric circular manifolds with L=4.7 $\mu m$.
Figure 10B:
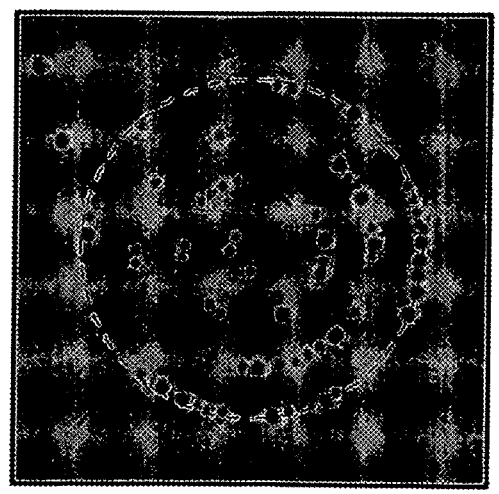
FIG. 10(b) is a mixture of large and small particles interacting with a fixed trapping pattern.

FIGS. 10(a)-10(d) present fractionation in a radial optical thermal ratchet. FIG. 10(a) presents the pattern of concentric circular manifolds with L=4.7 μm. FIG. 10(b) presents a mixture of large and small particles interacting with a fixed trapping pattern. FIG. 10(c) presents small particles collected and large excluded at L=4.9 μm and T=4.5 sec. FIG. 10(d) presents large particles concentrated at L=5.3 μm and T=4.5 sec. The scale bar indicates 10 μm.

Like the linear variant, the three-state radial ratchet has a deterministic operating regime in which objects are clocked inward or outward depending on the sequence of states. The additional geometric term in $V_{eff}(r)$ and the constraint that r>0 substantially affect the radial ratchet's operation in the stochastic regime by inducing a position-dependent outward drift. In particular, a particle being drawn inward by the ratchet effect must come to a rest at a radius where the ratchet-induced flux is balanced by the geometric drift. Outward-driven particles, by contrast, are excluded by the radial ratchet. Combining this effect with the three-state ratchet's natural propensity for mobility-dependent flux reversal suggests that radial ratchet protocols can be designed to sort mixtures in the field of view, expelling the unwanted fraction and concentrating the target fraction. This behavior is successfully demonstrated in FIG. 10(c), in which 1 μm diameter silica spheres (Bangs Laboratories, lot number 21024) have been collected within an outward-driving radial ratchet at L=4.9 μm at T-4.5 sec. while larger 1.53 μm diameter silica spheres are expelled, and in FIG. 10(d), in which the opposite is achieved with an inward-driving ratchet at L=5.3 μm and the same period, T=4.5 sec. A larger and more refined version might sort different fractions into concentric rings within the ratchet domain. This capability might find applications in isolating and identifying individual bacterial species within biofilms, for example.

This embodiment of the invention provides for one-dimensional thermal ratchet models implemented with holographic optical tweezer arrays. The use of discrete optical tweezers to create extensive potential energy landscapes characterized by large numbers of locally symmetric potential energy wells provides a practical method for thermal ratchet behavior to be induced in large numbers of diffusing objects in comparatively large volumes. The particular applications described herein all can be reduced to one-dimensional descriptions, and are conveniently analyzed with the conventional Fokker-Planck formalism. In each case, the ratchet-induced drift is marked by an operating point at which the flux reverses. In symmetric two-state traveling ratchets, flux reversal occurs at a point predicted by Reimann's symmetry selection rules. The three-state variants, on the other hand, undergo flux reversal as a consequence of a competition between the landscapes' temporal evolution and the Brownian particles' diffusion. The latter mechanism, in particular, suggests opportunities for practical sorting applications.

The protocols described herein can be generalized in several ways. The displacements between states, for example, could be selected to optimize transport speed or to tune the sharpness of the flux reversal transition for sorting applications. Similarly, the states in our three-state protocol need not have equal durations. They also might be tuned to optimize sorting, and perhaps to select a particular fraction from a mixture. The limiting generalization is a pseudo-continuous traveling ratchet with specified temporal evolution, $f(t)$. The present embodiment uses manifolds of traps which may all be of the same geometry and intensity. The present invention may also use manifolds of traps where the geometry and intensity are not all the same. These characteristics also can be specified, with further elaborations yielding additional control over the ratchet-induced transport. The protocols described here are useful for dealing with the statistical mechanics of symmetric traveling ratchets and may be used in practical applications.

Just as externally driven colloidal transport through static two-dimensional arrays of optical traps gives rise to a hierarchy of kinetically locked-in states, ratchet-induced motion through two-dimensional and three-dimensional holographic optical tweezer arrays is likely to be complex and interesting. Various other proposed higher-dimensional ratchet models have been experimentally implemented. None of these has explored the possibilities of scaling ratchets resembling the radial ratchet introduced here but with irreducible two- or three-dimensional structure.

D. Flux Reversal in Three State Thermal Ratchets

A cycle of three holographic optical trapping patterns can implement a thermal ratchet for diffusing colloidal spheres, and the ratchet-driven transport displays flux reversal as a function of the cycle frequency and the inter-trap separation. Unlike previously described ratchet models, the present invention involves three equivalent states, each of which is locally and globally spatially symmetric, with spatiotemporal symmetry being broken by the sequence of states.

Brownian motion cannot create a steady flux in a system at equilibrium. Nor can local asymmetries in a static potential energy landscape rectify Brownian motion to induce a drift. A landscape that varies in time, however, can eke a flux out of random fluctuations by breaking spatiotemporal symmetry. Such flux-inducing time-dependent potentials are known as thermal ratchets, and their ability to bias diffusion by rectifying thermal fluctuations has been proposed as a possible mechanism for transport by molecular motors and is being actively exploited for macromolecular sorting.

Most thermal ratchet models are based on spatially asymmetric potentials. Their time variation involves displacing or tilting them relative to the laboratory frame, modulating their amplitude, changing their periodicity, or some combination, usually in a two-state cycle. Thermal ratcheting in a spatially symmetric double-well potential has been demonstrated for a colloidal sphere in a pair of intensity modulated optical tweezers. More recently, directed transport has been induced in an atomic cloud by a spatially symmetric rocking ratchet created with an optical lattice.

The space-filling potential energy landscapes required for most such models pose technical challenges. Furthermore, their relationship to the operation of natural thermal ratchets has not been resolved. In this embodiment of the invention, a spatially symmetric thermal ratchet is shown implemented with holographic optical traps. The potential energy landscape in this system consists of a large number of discrete optical tweezers, each of which acts as a symmetric potential energy well for nanometer- to micrometer-scale objects such as colloidal spheres. These wells are arranged so that colloidal spheres can diffuse freely in the interstitial spaces but are localized rapidly once they encounter a trap. A three-state thermal ratchet then requires only displaced copies of a single two-dimensional trapping pattern. Despite its simplicity, this ratchet model displays flux reversal in which the direction of motion is controlled by a balance between the rate at which particles diffuse across the landscape and the ratchet's cycling rate.

FIGS. 11(a)-11(d) present a spatially-symmetric three-state ratchet potential comprised of discrete potential wells. Flux reversal has been directly observed in comparatively few systems. Flux reversal arises as a consequence of stochastic resonance for a colloidal sphere hopping between the symmetric double-well potential of a dual optical trap. Previous larger-scale demonstrations have focused on ratcheting of magnetic flux quanta through type-II superconductors in both the quantum mechanical and classical regimes, or else have exploited the crossover from quantum mechanical to classical transport in a quantum dot array. Unlike the present implementation, these exploit spatially asymmetric potentials and take the form of rocking ratchets. A similar crossover-mediated reversal occurs for atomic clouds in symmetric optical lattices. A hydrodynamic ratchet driven by oscillatory flows through asymmetric pores also shows flux reversal. In this case, however, the force field is provided by the divergence-free flow of an incompressible fluid rather than a potential energy landscape, and so is an instance of a so-called drift ratchet. Other well known implementations of classical force-free thermal ratchets also were based on asymmetric potentials, but did not exhibit flux reversal.

Figure 11C:
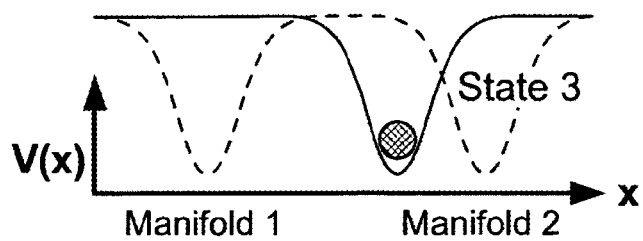
Figure 11D:
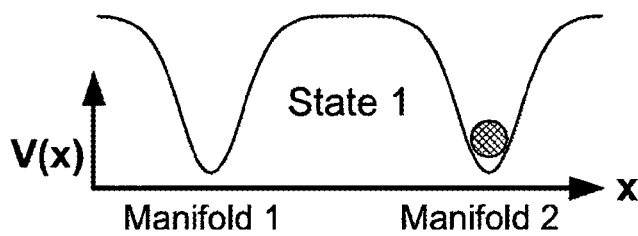

FIGS. 11(a)-11(d) show the principle upon which the three-state optical thermal ratchet operates. The process starts out with a pattern of discrete optical traps, each of which can localize an object. The pattern in the initial state is schematically represented as three discrete potential energy wells, each of width $\sigma$ and depth $V_0$, separated by distance L. A practical trapping pattern can include a great many optical traps organized into manifolds. The first pattern of FIG. 11(a) is extinguished after time T and replaced immediately with the second (FIG. 11(b)), which is displaced from the first by L/3. This is repeated in the third state with an additional step of L/3 (FIG. 11(c)), and again when the cycle is completed by returning to the first state (FIG. 11(d)).

If the traps in a given state overlap those in the state before, a trapped particle is transported deterministically forward. Running through this cycle repeatedly transfers the object in a direction determined unambiguously by the sequence of states, and is known as optical peristalsis. The direction of motion can be reversed only by reversing the sequence.

The optical thermal ratchet differs from this in that the inter-trap separation L is substantially larger than $\sigma$. Consequently, particles trapped in the first pattern are released into a force-free region and can diffuse freely when that pattern is replaced by the second. Those particles that diffuse far enough to reach the nearest traps in the second pattern rapidly become localized. A comparable proportion of this localized fraction then can be transferred forward again once the third pattern is projected, and again when the cycle returns to the first state.

Unlike optical peristalsis, in which all particles are promoted in each cycle, the stochastic ratchet transfers only a fraction. This, however, leads to a new opportunity. Particles that miss the forward-going wave might still reach a trap on the opposite side of their starting point while the third pattern is illuminated. These particles would be transferred backward by L/3 after time 2T.

For particles of diffusivity D, the time required to diffuse the inter-trap separation is $\tau = L^2/(2D)$. Assuming that particles begin each cycle well localized at a trap, and that the traps are well separated compared to their widths, then the probability for ratcheting forward by L/3 during the interval T is roughly $P_F \approx \exp(-(L/3)^2/(2DT))$, while the probability of ratcheting backwards in time 2T is roughly $P_R \approx \exp(-(L/3)^2/(4DT))$. The associated fluxes of particles then are $v_F = P_F L/(3T)$ and $v_R = -P_R L/(6T)$, with the dominant term determining the overall direction of motion. The direction of induced motion may be expected to reverse when $P_F \approx \exp(-(L/3)^2/(2DT))$, or for example when $T/\tau < (18 \ln 2)^{-1} \approx 0.08$.

More formally, this can be modeled as an array of optical traps in the n-th pattern as Gaussian potential wells $$V_n(x) = \sum_{j=-N}^{N} -V_0 \exp\left(-\frac{\left(x - jL - n\frac{L}{3}\right)^2}{2\sigma^2}\right), \tag{71}$$

where n=0, 1, or 2, and N sets the extent of the landscape. The probability density $\rho(x,t)dx$ for finding a Brownian particle within dx of position x at time t in state n evolves according to the master equation, $$\rho(y,t+T) = \int P_n(y,T|x,0)\rho(x,t)dx, \tag{72}$$

characterized by the propagator $$P_n(y,T|x,0) = e^{L_n(y)T}\delta(y-x), \tag{73}$$

where the Liouville operator for state n is $$L_n(y) = D\left(\frac{\partial^2}{\partial y^2} - \beta \frac{\partial}{\partial y} V'_n(y)\right), \tag{74}$$

with $$V'_n(y) = \frac{dV_n}{dy},$$

and where $\beta^{-1}$ is the thermal energy scale.

The master equation for a three-state cycle is $$\rho(y,t+3T) = \int P_{123}(y,3T|x,0)\rho(x,t)dx, \tag{75}$$

with the three-state propagator $$P_{123}(y,3T|x,0) = \int dy_1 dy_2 P_3(y,T|y_2,0) x P_2(y_2,T|y_1,0) P_1(y_1,T|x,0)). \tag{76}$$

Because the landscape is periodic and analytic, Eq. (75) has a steady-state solution such that $$\rho(x,t+3T) = \rho(x,t) \tag{77}$$

$$\equiv \rho_{123}(x). \tag{78}$$

The mean velocity of this steady-state then is given by $$v = \int P_{123}(y, 3T \mid x, 0)\left(\frac{y-x}{3T}\right)\rho_{123}(x)dxdy, \tag{79}$$

where $P_{123}(y,3T|x,0)$ is the probability for a particle originally at position x to "jump" to position y by the end of one compete cycle, $(y-x)/(3T)$ is the velocity associated with making such a jump, and $\rho_{123}(x)$ is the fraction of the available particles actually at x at the beginning of the cycle in steady-state. This formulation is invariant with respect to cyclic permutations of the states, so that the same flux of particles would be measured at the end of each state. The average velocity v therefore describes the time-averaged flux of particles driven by the ratchet.

Figure 12A:
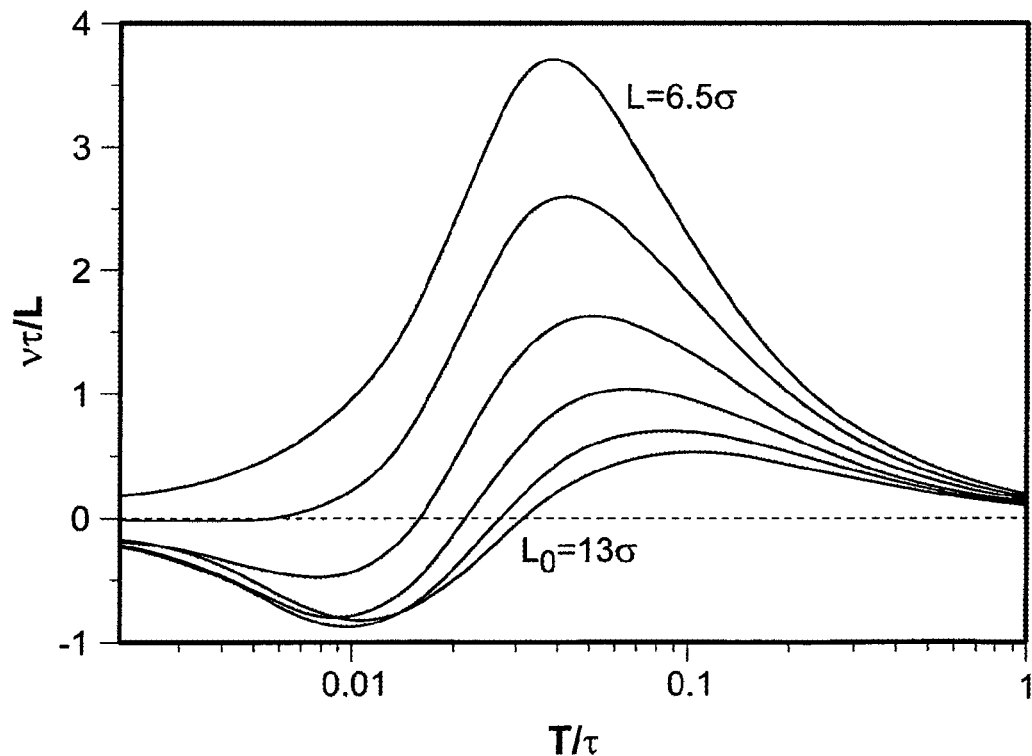
FIG. 12(a) shows cross-over from deterministic optical peristalsis at L=6.5$\sigma$ to thermal ratchet behavior with flux reversed at L-130 for a three-state cycle of Gaussian well potentials at $\beta V_0=8.5$, $\sigma=0.53\,\mu m$ and D=0.33 $\mu m^2/sec.$.

FIG. 12(a) shows numerical solutions of this system of equations for representative values of the relative inter-well separation L/σ. If the interval T between states is very short, particles are unable to keep up with the evolving potential energy landscape, and so never travel far from their initial positions; the mean velocity vanishes in this limit. The transport speed v also vanishes as 1/T for large values of T because the induced drift becomes limited by the delay between states. If traps in consecutive patterns are close enough (L=6.5σ in FIG. 12(a)) particles jump forward at each transition with high probability, yielding a uniformly positive drift velocity. This transfer reaches its maximum efficiency for moderate cycle times, $T/\tau \approx 2\sqrt{2}(L/\sigma)(\beta V_0)^{-1}$. More widely separated traps (L=13σ in FIG. 12(a)) yield more interesting behavior. Here, particles are able to keep up with the forward-going wave for large values of T. Faster cycling, however, leads to flux reversal, characterized by negative values of v.

Figure 12B:
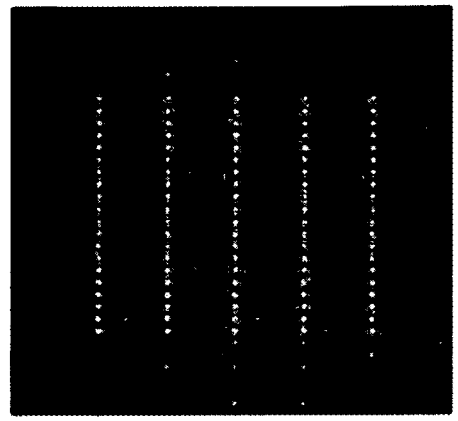
FIG. 12(b) is for evenly spaced values of L with the image of 20×5 array of holographic optical traps at $L_0=6.7\,\mu m$.
Figure 12C:
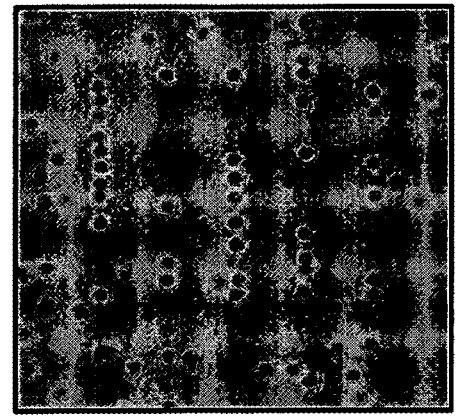
FIG. 12(c) is an image of colloidal silica spheres 1.53 $\mu m$ in diameter interacting with the array.
Figure 12D:
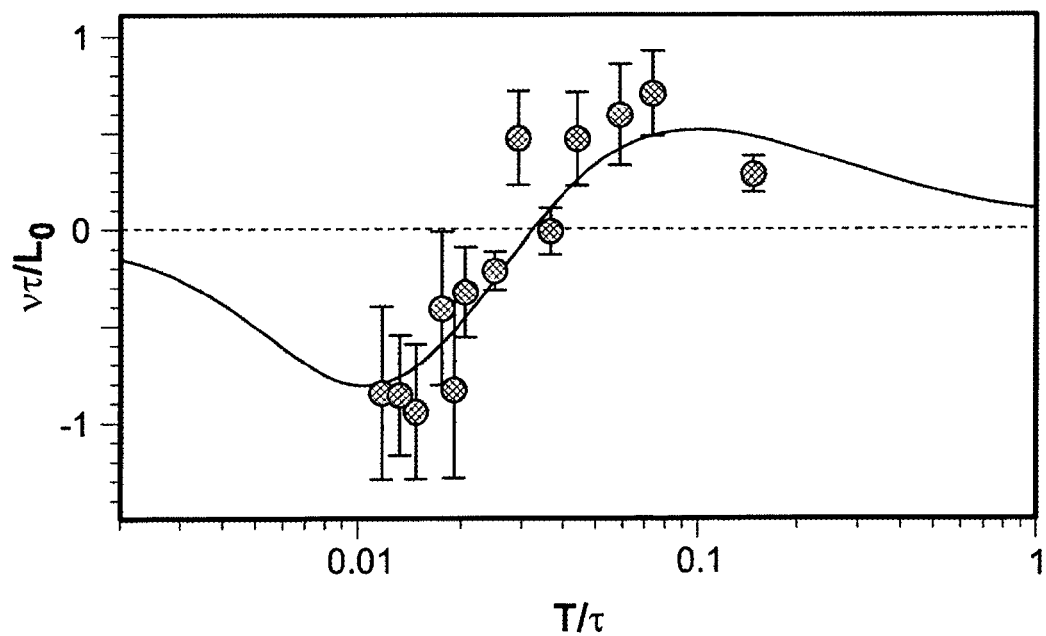
FIG. 12(d) shows rate dependence of the induced drift velocity for fixed inter-trap separation, $L_0$.
Figure 12E:
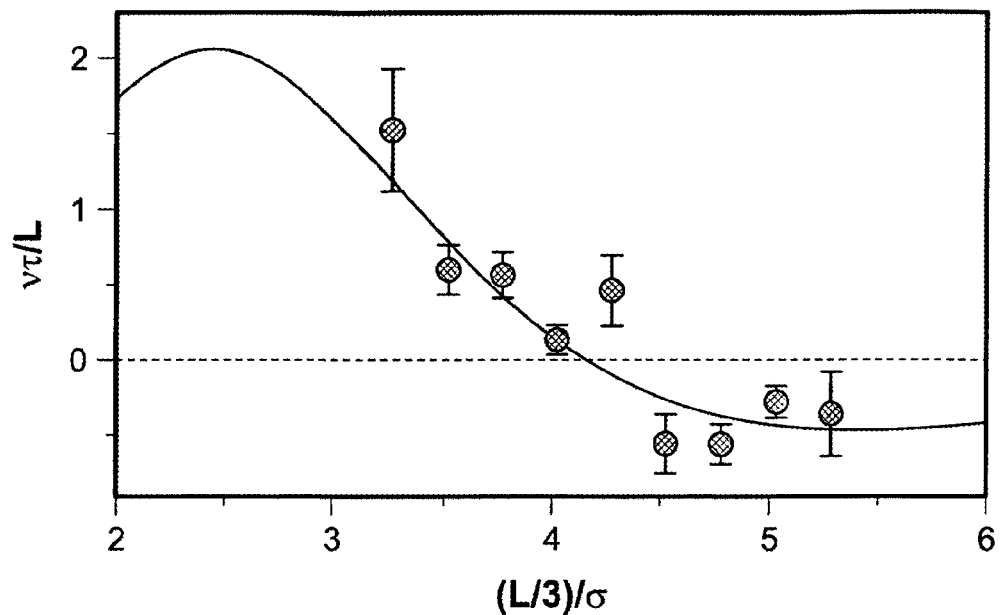
FIG. 12(e) shows separation dependence for fixed inter-state delay, T=2 sec.

FIG. 12(a) further presents crossover from deterministic optical peristalsis at L=6.5σ to thermal ratchet behavior with flux reversal at L=13σ for a three-state cycle of Gaussian well potentials at $\beta V_0$=8.5, σ=0.53 μm and D=0.33 μm²/sec. Intermediate curves are calculated for evenly spaced values of L. FIG. 12(b) presents an image of 20×5 array of holographic optical traps at $L_0$=6.7 μm. FIG. 12(c) presents an image of colloidal silica spheres 1.53 μm in diameter interacting with the array. FIG. 12(d) presents the rate dependence of the induced drift velocity for fixed inter-trap separation, $L_0$. FIG. 12(e) presents the separation dependence for fixed inter-state delay, T=2 sec.

As an example of operation, this thermal ratchet protocol is implemented for a sample of 1.53 μm diameter colloidal silica spheres (Bangs Laboratories, lot number 5328) dispersed in water, using potential energy landscapes created from arrays of holographic optical traps. The sample was enclosed in a hermetically sealed glass chamber roughly 40 μm thick created by bonding the edges of a coverslip to a microscope slide and was allowed to equilibrate to room temperature (21±1° C.) on the stage of a Zeiss S100TV Axiovert inverted optical microscope. A 100×NA 1.4 oil immersion SPlan Apo objective lens was used to focus the optical tweezer array into the sample and to image the spheres, whose motions were captured with an NEC TI 324A low noise monochrome CCD camera. The micrograph in FIG. 12(b) shows the focused light from a 20×5 array of optical traps formed by a phase hologram projected with a Hamamatsu X7550 spatial light modulator. The tweezers are arranged in twenty-trap manifolds 25 μm long separated by $L_0$=6.7 μm. Each trap is powered by an estimated 2.5±0.4 mW of laser light at 532 nm. The particles, which appear in the bright-field micrograph in FIG. 12(c), are twice as dense as water and sediment to the lower glass surface, where they diffuse freely in the plane with a measured diffusion coefficient of D=0.33±0.03 μm²/sec, which reflects the influence of the nearby wall. Out-of-plane fluctuations were minimized by projecting the traps at the spheres' equilibrium height above the wall.

Three-state cycles of optical trapping patterns are projected in which the manifolds in FIG. 12(b) were displaced horizontally by $-L_0/3$, 0, and $L_0/3$, with inter-state delay times T ranging from 0.8 sec. to 10 sec. The particles' motions were recorded as uncompressed digital video streams for analysis. Between 40 and 60 particles were in the trapping pattern during a typical run, so that roughly 40 cycles sufficed to acquire reasonable statistics under each set of conditions without complications due to collisions. Particles outside the trapping pattern are tracked to monitor their diffusion coefficients and to ensure the absence of drifts in the supporting fluid. The results plotted in FIG. 12(d) reveal flux reversal at T/τ≈0.03. Excellent agreement with Eq. (79) is obtained for $\beta V_0$=8.5±0.8 and σ=0.53±0.01 μm.

The appearance of flux reversal as one parameter is varied implies that other parameters also should control the direction of motion. Indeed, flux reversal is obtained in FIG. 12(e) as the inter-trap separation is varied from L=5.1 μm to 8.3 μm at fixed delay time, T=2 sec. These results also agree well with predictions of Eq. (79), with no adjustable parameters. The same effect also should arise for different populations in a heterogeneous sample with different values of D, $V_0$ and σ. In this case, distinct fractions can be induced to move simultaneously in opposite directions.

Such sensitivity of the transport direction to details of the dynamics also might play a role in the functioning of molecular motors such as myosin-VI whose retrograde motion on actin filaments compared with other myosins has excited much interest. This molecular motor is known to be nonprocessive; its motion involves a diffusive search of the actin filament's potential energy landscape, which nevertheless results in unidirectional hand-over-hand transport. These characteristics are consistent with the present model's tim-

E. Flux Reversal for Two-State Thermal Ratchets

Another exemplary embodiment of the present invention is presented for two state ratchets. A Brownian particle's random motions can be rectified by a periodic potential energy landscape that alternates between two states, even if both states are spatially symmetric. If the two states differ only by a discrete translation, the direction of the ratchet-driven current can be reversed by changing their relative durations. The present embodiment provides flux reversal in a symmetric two-state ratchet by tracking the motions of colloidal spheres moving through large arrays of discrete potential energy wells created with dynamic holographic optical tweezers. The model's simplicity and high degree of symmetry suggest possible applications in molecular-scale motors.

Until fairly recently, random thermal fluctuations were considered impediments to inducing motion in systems such as motors. Fluctuations can be harnessed, however, through mechanisms such as stochastic resonance and thermal ratchets, as efficient transducers of input energy into mechanical motion. Unlike conventional machines, which battle noise, molecular-scale devices that exploit these processes actually requite thermal fluctuations to operate.

The present embodiment creates thermal ratchets in which the random motions of Brownian particles are rectified by a time-varying potential energy landscape. Even when the landscape has no overall slope and thus exerts no average force, directed motion still can result from the accumulation of coordinated impulses. Most thermal ratchet models break spatiotemporal symmetry by periodically translating, tilting or otherwise modulating a spatially asymmetric landscape. Inducing a flux is almost inevitable in such systems unless they satisfy conditions of spatiotemporal symmetry or supersymmetry. Even a spatially symmetric landscape can induce a flux with appropriate driving. Unlike deterministic motors, however, the direction of motion in these systems can depend sensitively on implementation details.

A spatially symmetric three-state thermal ratchet is demonstrated for micrometer-scale colloidal particles implemented with arrays of holographic optical tweezers, each of which constitutes a discrete potential energy well. Repeatedly displacing the array first by one third of a lattice constant and then by two thirds breaks spatiotemporal symmetry in a manner that induces a flux. Somewhat surprisingly, the direction of motion depends sensitively on the duration of the states relative to the time required for a particle to diffuse the intertrap separation. The induced flux therefore can be canceled or even reversed by varying the rate of cycling, rather than the direction. This approach builds upon the pioneering demonstration of unidirectional flux induced by a spatially asymmetric time-averaged optical ratchet, and of reversible transitions driven by stochastic resonance in a dual-trap rocking ratchet.

Figure 13:
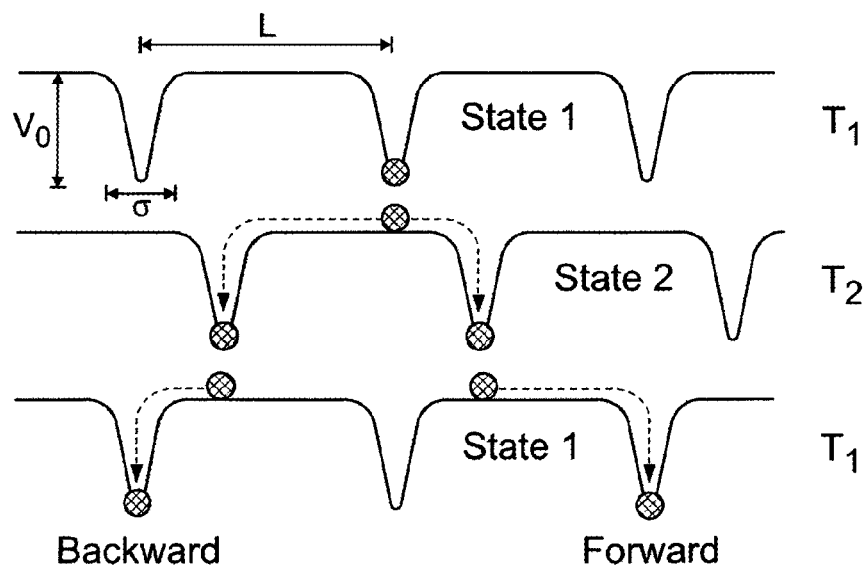
FIG. 13 shows one complete cycle of a spatially symmetric two-state ratchet potential comprised of discrete potential wells.

FIG. 13 presents a sequence of one complete cycle of a spatially-symmetric two-state ratchet potential comprised of discrete potential wells.

Here, flux induction and flux reversal is demonstrated in a symmetric two-state thermal ratchet implemented with dynamic holographic optical trap arrays. The transport mechanism for this two-state ratchet is more subtle than the previous three-state model in that the direction of motion is not easily intuited from the protocol. Its capacity for flux reversal in the absence of external loading, by contrast, can be inferred immediately by considerations of spatiotemporal symmetry. This also differs from the three-state ratchet and the rocking double-tweezer in which flux reversal results from a finely tuned balance of parameters.

FIG. 13 schematically therefore depicts how the two-state ratchet operates. Each state consists of a pattern of discrete optical traps, modeled here as Gaussian wells of width $\sigma$ and depth $V_0$, uniformly separated by a distance $L \gg \sigma$. The first array of traps is extinguished after time $T_1$ and replaced immediately with a second array, which is displaced from the first by $L/3$. The second pattern is extinguished after time $T_2$ and replaced again by the first, thereby completing one cycle.

If the potential wells in the second state overlap those in the first, then trapped particles are handed back and forth between neighboring traps as the states cycle, and no motion results. This also is qualitatively different from the three-state ratchet, which deterministically transfers particles forward under comparable conditions, in a process known as optical peristalsis. The only way the symmetric two-state ratchet can induce motion is if trapped particles are released when the states change and then diffuse freely.

Figure 14A:
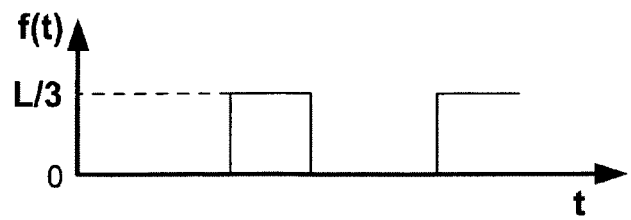
FIG. 14(a) shows a displacement function $f(t)$.
Figure 14B:
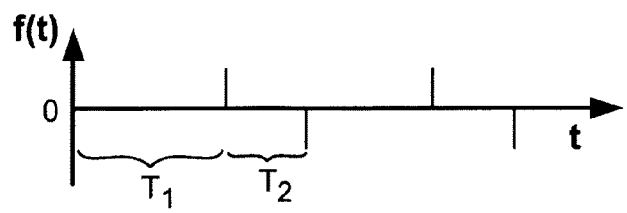
FIG. 14(b) shows an equivalent-ratchet driving force.

FIG. 14(a) presents a displacement function $f(t)$ and FIG. 14(b) presents equivalent tilting-ratchet driving force, $F(t) = -\eta \dot{f}(t)$.

The motion of a Brownian particle in this system can be described with the one-dimensional Langevin equation $$\eta \dot{x}(t) = -V'(x(t) - f(t)) + \xi(t), \quad (80)$$

where $\eta$ is the fluid's dynamic viscosity, $V(x)$ is the potential energy landscape, $V'(x) = \partial V(x)/\partial x$ is its derivative, and $\xi(t)$ is a delta-correlated stochastic force representing thermal noise. The potential energy landscape in our system is spatially periodic with period $L$, $$V(x+L) = V(x). \quad (81)$$

The time-varying displacement of the potential energy in our two-state ratchet is described by a periodic function $f(t)$ with period $T = T_1 + T_2$, which is plotted in FIG. 14(a).

The equations describing this traveling potential ratchet can be recast into the form of a tilting ratchet, which ordinarily would be implemented by applying an oscillatory external force to objects on an otherwise fixed landscape. The appropriate coordinate transformation, $y(t) = x(t) - f(t)$, yields $$\eta \dot{y}(t) = -V'(y(t)) + F(t) + \xi(t), \quad (82)$$

where $F(t) = -\eta \dot{f}(t)$ is the effective driving force. Because $f(t)$ has a vanishing mean, the average velocity of the original problem is the same as that of the transformed tilting ratchet $\langle \dot{x} \rangle = \langle \dot{y} \rangle$, where the angle brackets imply both an ensemble average and an average over a period T.

Reimann has demonstrated that a steady-state flux, $\langle \dot{y} \rangle \neq 0$, develops in any tilting ratchet that breaks both spatiotemporal symmetry, $$V(y) = V(-y), \text{ and } -F(t) = F(t+T/2), \quad (83)$$

and also spatiotemporal supersymmetry, $$-V(y) = V(y+L/2), \text{ and } -F(t) = F(-t). \quad (84)$$

for any $\Delta t$. No flux results if either of Eqs. (83) or (84) is satisfied.

The optical trapping potential depicted in FIG. 13 is symmetric but not supersymmetric. Provided that $F(t)$ violates the symmetry condition in Eq. (83), the ratchet must induce directed motion. Although $F(t)$ is supersymmetric, as can be seen in FIG. 14(b), it is symmetric only when $T_1 = T_2$. Consequently, we expect a particle current for $T_1 \neq T_2$. The zero crossing at $T_1 = T_2$ furthermore portends flux reversal on either side of the equality.

Figure 15:
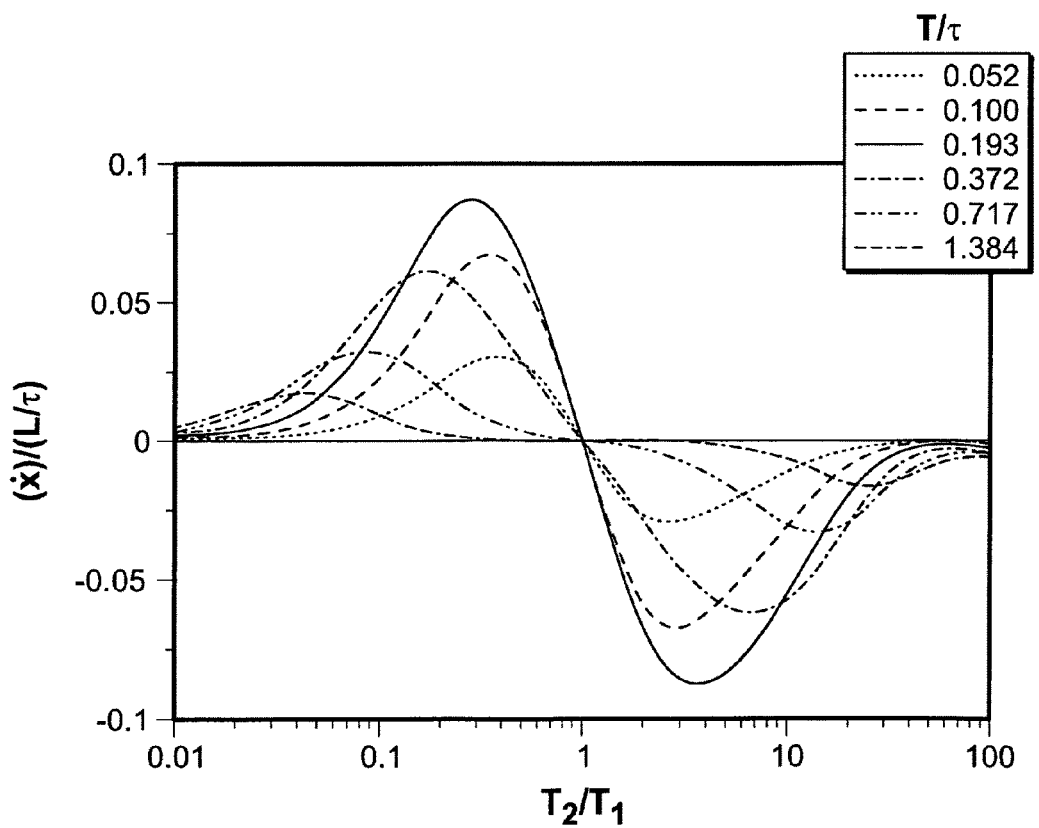
FIG. 15 shows steady-state drift velocity as a function of the relative dwell time, $T_2/T_1$, for $BV_0=3.04$, $L=5.2\,\mu m$, $\sigma=0.80\,\mu m$ and various values of T/t (optimized at T/$\tau$=0.193)

FIG. 15 presents steady-state drift velocity as a function of the relative dwell time, $T_2/T_1$, for $\beta V_0 = 3.04$, $L = 5.2$ μm, σ=0.80 µm, and various values of T/τ. Transport is optimized under these conditions by running the ratchet at T/τ=0.193.

The steady-state velocity is calculated for this system by solving the master equation associated with Eq. (80). The probability for a driven Brownian particle to drift from position $x_0$ to within dx of position x during the interval t, is given by the propagator $$P(x,t|x_0,0)dx = e^{\int L(x,t')dt'}\delta(x-x_0)dx, \quad (85)$$

where the Liouville operator is $$L(x,t) = D\left(\frac{\partial^2}{\partial x^2} + \beta\frac{\partial}{\partial x}V'(x,t)\right), \quad (86)$$

and where $\beta^{-1}$ is the thermal energy scale. The steady-state particle distribution ρ(x) is an eigenstate of the master equation $$\rho(x) = \int P(x,t|x_0)\rho(x_0)dx_0, \quad (87)$$

and the associated steady-state flux is $$v = \int \frac{x-x_0}{T}\rho(x_0)P(x,T|x_0,0)dxdx_0. \quad (88)$$

The natural length scale in this problem is L, the inter-trap spacing in either state. The natural time scale, $\tau = L^2/(2D)$, is the time required for particles of diffusion constant D to diffuse this distance.

FIG. 15 shows how ν varies with $T_2/T_1$ for various values of T/τ for experimentally accessible values of $V_0$, σ, and L. As anticipated, the net drift vanishes for $T_2=T_1$. Less obviously, the induced flux is directed from each well in the longer-duration state toward the nearest well in the short-lived state. The flux falls off as 1/T in the limit of large T because the particles spend increasingly much of their time localized in traps. It also diminishes for short T because the particles cannot keep up with the landscape's evolution. In between, the range of fluxes can be tuned with T.

Figure 16A:
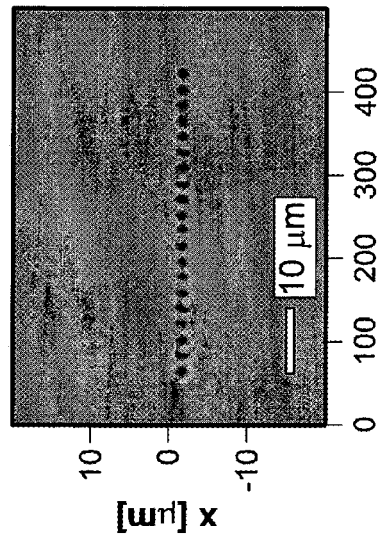
FIG. 16(a) shows an image of 5×20 array of holographic optical traps at L=5.2 $\mu m$.
Figure 16B:
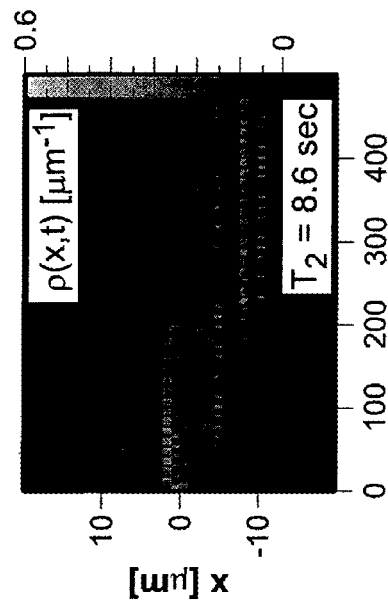
FIG. 16(b) shows a video micrograph of colloidal silica spheres 1.53 $\mu m$ in diameter trapped in the middle row of the array at the start of an experimental run.
Figure 16C:
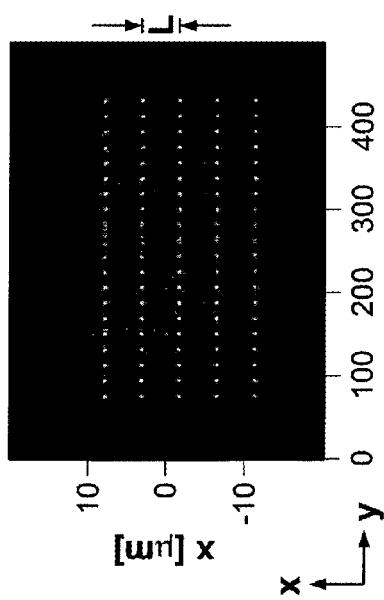
FIGS. 16(c) and 16(d) show time evolution of the measured probability density for finding particles at $T_2=0.8$ sec. and $T_2=8.6$ sec., respectively, with $T_1$ fixed at 3 sec.
Figure 16D:
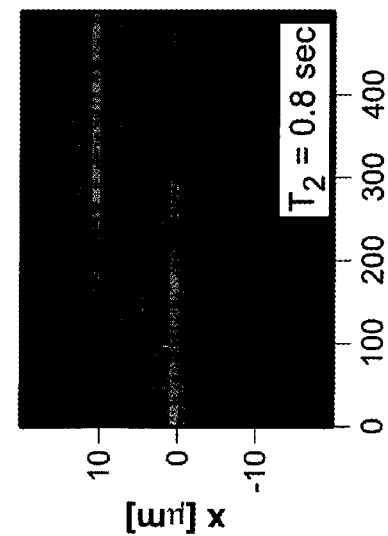
Figure 16E:
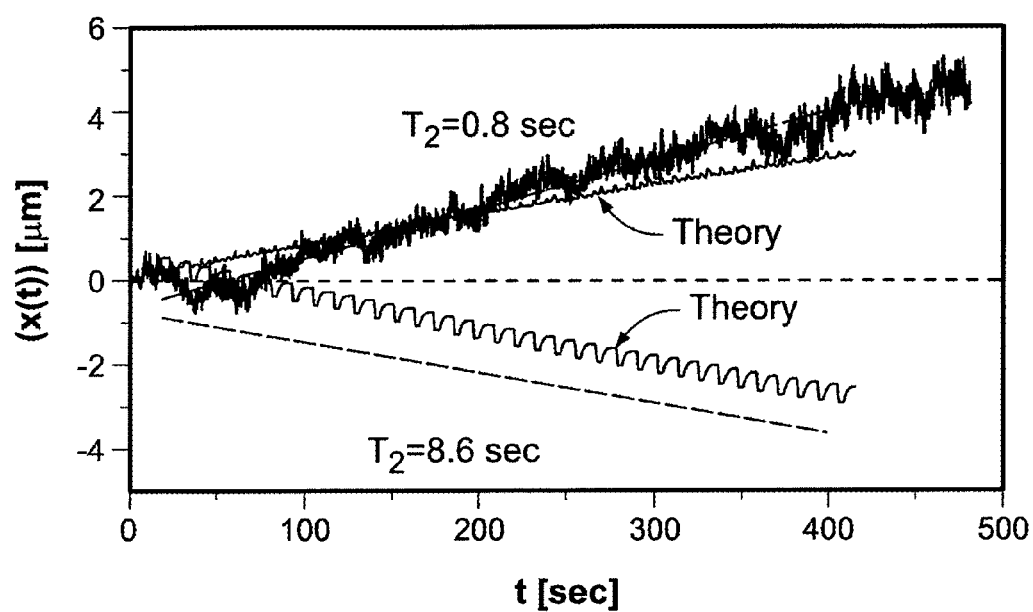
FIG. 16(e) shows time evolution of the particles' mean position calculated from the distribution functions in FIGS. 16(c) and 16(d) (the slopes of linear fits provide estimates for the induced drift velocity, which can be compared with displacements calculated with Eq. (89) for $\beta V_0=2.5$, and $\sigma=0.65$)
Figure 16F:
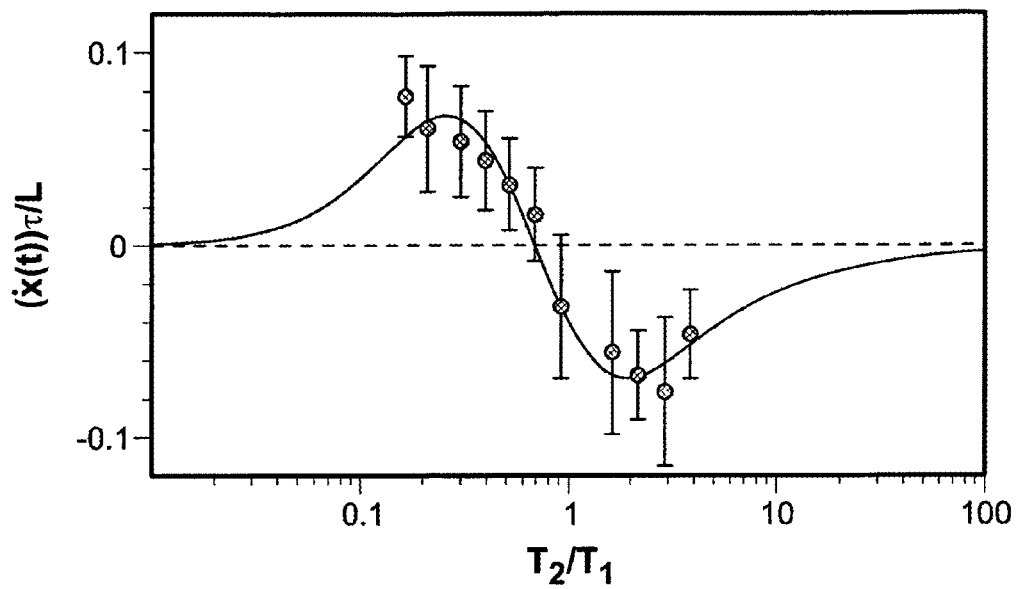
FIG. 16(f) shows measured drift speed as a function of relative dwell time $T_2/T_1$, compared with predictions of Eq. (88)

FIG. 16(a) presents an image of 5×20 array of holographic optical traps at L=5.2 µm FIG. 16(b) presents a video micrograph of colloidal silica spheres 1.53 µm in diameter trapped in the middle row of the array at the start of an experimental run. FIGS. 16(c) and 16(d) present the time evolution of the measured probability density for finding particles at $T_2$=0.8 sec and $T_2$=8.6 sec, respectively, with $T_1$ fixed at 3 sec. FIG. 16(e) presents the time evolution of the particles' mean position calculated from the distribution functions in 16(c) and 16(d). The slopes of linear fits provide estimates for the induced drift velocity, which can be compared with displacements calculated with Eq. (89) for $\beta V_0$=2.75, and σ=0.65 µm FIG. 16(f) presents the measured drift speed as a function of relative dwell time $T_2/T_1$, compared with predictions of Eq. (88).

As an example, this method is implemented for a sample of 1.53 µm diameter colloidal silica spheres (Bangs Laboratories, lot number 5328) dispersed in water, using potential energy landscapes created from arrays of holographic optical traps. The sample was enclosed in a hermetically sealed glass chamber roughly 40 µm thick created by bonding the edges of a coverslip to a microscope slide, and was allowed to equilibrate to room temperature (21±1° C.) on the stage of a Zeiss S100 2TV Axiovert inverted optical microscope. A 100×NA 1.4 oil immersion SPlan Apo objective lens was used to focus the optical tweezer array into the sample and to image the spheres, whose motions were captured with an NEC TI 324A low noise monochrome CCD camera. The micrograph in FIG. 16(a) shows the focused light from a 5×20 array of optical traps formed by a phase hologram projected with a Hamamatsu X7550 spatial light modulator [17]. The tweezers are arranged in twenty-trap manifolds 37 µm long separated by L=5.2 µm. Each trap is powered by an estimated 2.5±0.4 mW of laser light at 532 nm. The particles, which appear in the bright-field micrograph in FIG. 16(b), are twice as dense as water and sediment to the lower glass surface, where they diffuse freely in the plane with a measured diffusion coefficient of D=0.33±0.03 µm²/sec. This establishes the characteristic time scale for the system of τ=39.4 sec, which is quite reasonable for digital video microscopy studies. Out-of-plane fluctuations were minimized by focusing the traps at the spheres' equilibrium height above the wall.

Two-state cycles of optical trapping patterns are projected in which the manifolds in FIG. 16(a) were alternately displaced in the spheres' equilibrium plane by L/3, with the duration of the first state fixed at $T_1$=3 sec and $T_2$ ranging from 0.8 sec to 14.7 sec. To measure the flux induced by this cycling potential energy landscape for one value of $T_2$, we first gathered roughly two dozen particles in the middle row of traps in state 1, as shown in FIG. 16(b), and then projected up to one hundred periods of two-state cycles. The particles' motions were recorded as uncompressed digital video streams for analysis. Their time-resolved trajectories then were averaged over the transverse direction into the probability density, ρ(x,t)Δx, for finding particles within Δx=0.13 µm of position x after time t. We also tracked particles outside the trapping pattern to monitor their diffusion coefficients and to ensure the absence of drifts in the supporting fluid. Starting from this well-controlled initial condition resolves any uncertainties arising from the evolution of nominally random initial conditions.

FIGS. 16(c) and 16(d) show the spatially-resolved time evolution of ρ(x,t) for $T_2$=0.8 sec <$T_1$ and $T_2$=8.6 sec >$T_1$ In both cases, the particles spend most of their time localized in traps, visible here as bright stripes, occasionally using the shorter-lived traps as springboards to neighboring wells in the longer-lived state. The mean particle position $\langle x(t)\rangle = \int x\rho(x,t)$ dx advances as the particles make these jumps, with the associated results plotted in FIG. 16(e).

The speed with which an initially localized state, ρ(x,0)≈δ(x), advances differs from the steady-state speed plotted, in FIG. 15, but still can be calculated as the first moment of the propagator, $$\langle x(t)\rangle = \int yP(y,t|0,0)dy. \quad (89)$$

Numerical analysis reveals a nearly constant mean speed that agrees quite closely with the steady-state speed from Eq. (88).

Fitting traces such as those in FIG. 16(e) to linear trends provides estimates for the ratchet-induced flux, which are plotted in FIG. 16(f). The solid curve in FIG. 16(f) shows excellent agreement with predictions of Eq. (89) for $\beta V_0$=2.75±0.5 and σ=0.65±0.05 µm.

Figure 17:
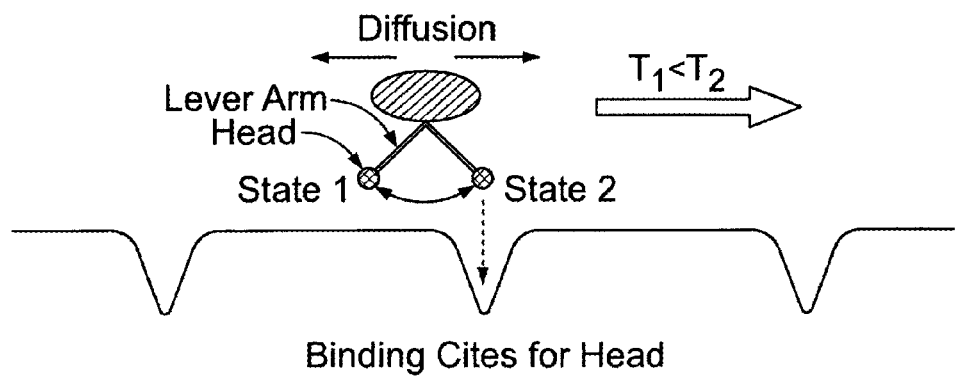
FIG. 17 shows a model of a diffusive molecular motor.

The two-state ratchet method presented herein therefore involves updating the optical intensity pattern to translate the physical landscape. However, the same principles can be applied to systems in which the landscape remains fixed and the object undergoes cyclic transitions between two states. FIG. 17 depicts a model for an active two-state walker on a fixed physical landscape that is inspired by the biologically relevant transport of single myosin head groups along actin filaments. The walker consists of a head group that interacts with localized potential energy wells periodically distributed on the landscape. It also is attached to a lever arm that uses an external energy source to translate the head group by a distance somewhat smaller than the inter-well separation. The other end of the lever arm is connected to the payload, whose viscous drag would provide the leverage necessary to translate the head group between the extended and retracted states. Switching between the walker's two states is equivalent to the two-state translation of the potential energy landscape in our experiments, and thus would have the effect of translating the walker in the direction of the shorter-lived state. A similar model in which a two-state walker traverses a spatially asymmetric potential energy landscape yields deterministic motion at higher efficiency than the present model. It does not, however, allow for reversibility. The length of the lever arm and the diffusivity of the motor's body and payload determine the ratio $T/\tau$ and thus the motor's efficiency. The two-state ratchet's direction does not depend on $T/\tau$, however, even under heavy loading. This differs from the three-state ratchet, in which $T/\tau$ also controls the direction of motion. This protocol could be used in the design of mesoscopic motors based on synthetic macromolecules or microelectromechanical systems (MEMS).

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of optimizing a plurality of optical traps, comprising:
   providing a collimated beam of light from a light source;
   imprinting the collimated beam of light with a computer-generated hologram;
   processing the collimated beam of light with a diffractive optical element to provide a plurality of independent beams of light;
   relaying the independent beams to an input aperture of a lens;
   focusing the independent beams on an objective focal plane; and
   focusing an undiffracted portion of the beam of light,
wherein the beam of light converges as it passes through the diffractive optical element, causing the undiffracted portion of beam of light to focus upstream of the objective focal plane.

2. The method of claim 1, wherein the computer-generated holography includes a wavefront-shaping phase function.

3. The method of claim 1, further comprising a beam block in an intermediate focal plane, the beam block spatially filtering the undiffracted portion of the beam of light.

4. The method of claim 1, wherein the beam of light comprises a laser beam.

5. The method of claim 2 wherein the wavefront-shaping phase function creates a potential energy landscape.

6. The method as defined in claim 2 wherein the wavefront-shaping phase function is selected from the group of an optical source and a hologram.

7. The method as defined in claim 5 wherein the potential energy landscape comprises a pattern of potential wells.

8. The method as defined in claim 2 wherein the wavefront-shaping phase function comprises an optical holographic source.

9. The method as defined in claim 5 wherein the potential energy landscape comprises a pattern of optical potential wells.

10. The method as defined in claim 5 further including the step of moving the potential energy landscape by dynamically changing the wavefront-shaping phase function.

11. The method as defined in claim 5 wherein the potential energy landscape comprises an optical trap array.

12. The method as defined in claim 5 wherein the potential energy landscape includes at least three different ones of the landscape projected over time and space to manipulate a plurality of objects.

13. The method as defined in claim 5 wherein the potential energy landscape is projected in three dimensions and a plurality of objects are trapped and have at least molecular size dimensions.

14. The method as defined in claim 1 further including a step of moving ghost traps, thereby suppressing effects of the ghost trap on the plurality of optical traps.

15. The method as defined in claim 1 further including a step of projecting ghost traps outside a sample volume thereby reducing the effect of the ghost traps on the plurality of optical traps.

16. The method as defined in claim 1 further including a step of projecting ghost traps outside a sample volume thereby reducing the effect of the ghost traps on the potential energy landscape in the sample volume.

17. The method as defined in claim 1 further including a step of moving ghost traps, thereby suppressing effects of the ghost trap on the potential energy landscape in the sample volume.

* * * * *